FIG_1

BURTON C. COONS

April 23, 1946. B. C. COONS 2,398,922
METHOD AND APPARATUS FOR FEEDING FRUIT AND VEGETABLES
Filed July 24, 1942 9 Sheets-Sheet 5

Inventor
BURTON C. COONS
Philip A. Minnie
Attorney

April 23, 1946.　　　B. C. COONS　　　2,398,922
METHOD AND APPARATUS FOR FEEDING FRUIT AND VEGETABLES
Filed July 24, 1942　　　9 Sheets-Sheet 6
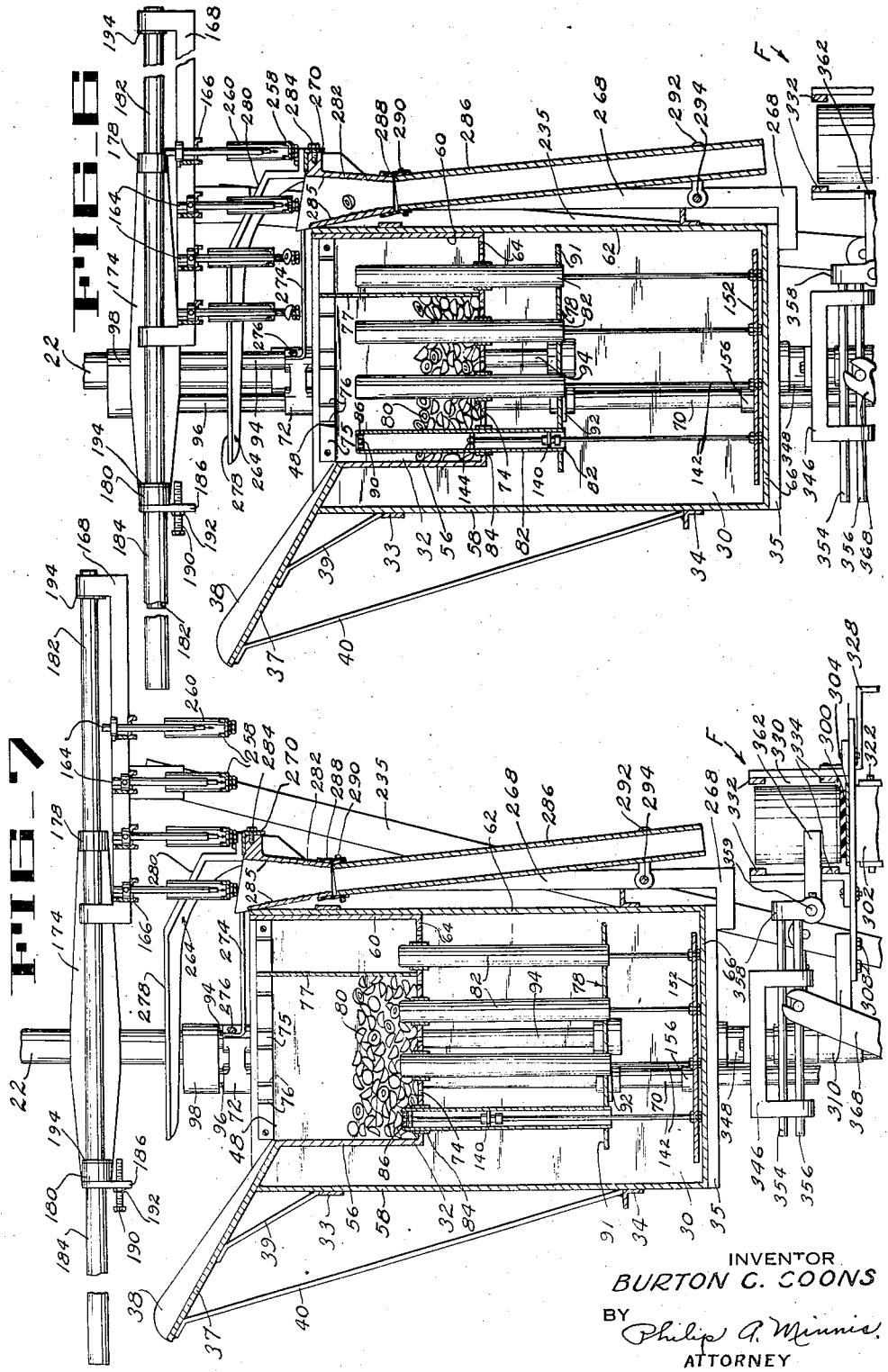
INVENTOR
BURTON C. COONS
BY Philip P. Minnis
ATTORNEY April 23, 1946. B. C. COONS 2,398,922
METHOD AND APPARATUS FOR FEEDING FRUIT AND VEGETABLES
Filed July 24, 1942 9 Sheets-Sheet 7
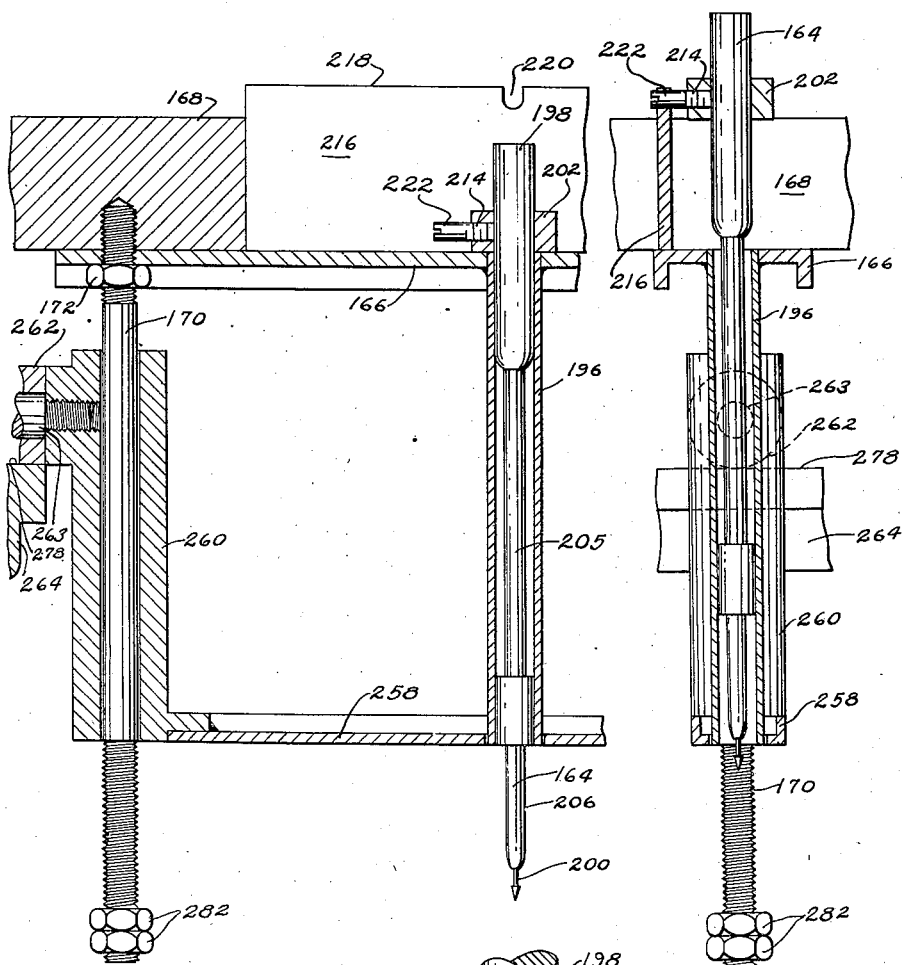
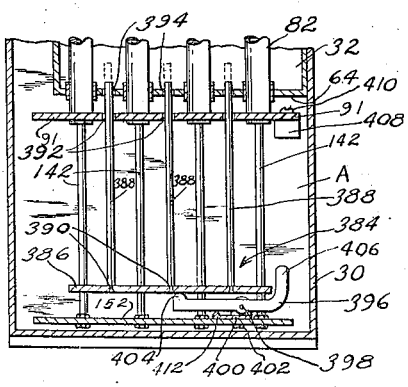
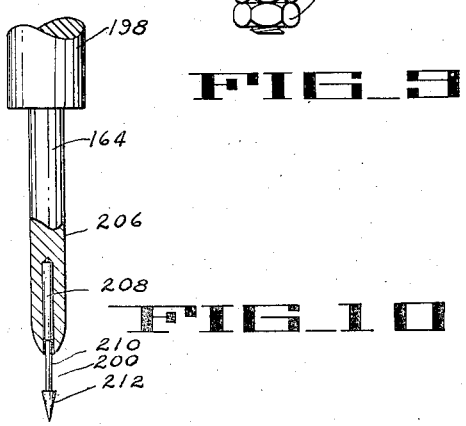
INVENTOR
BURTON C. COONS
BY Philip A. Minnis
ATTORNEY April 23, 1946.　　B. C. COONS　　2,398,922
METHOD AND APPARATUS FOR FEEDING FRUIT AND VEGETABLES
Filed July 24, 1942　　9 Sheets-Sheet 8
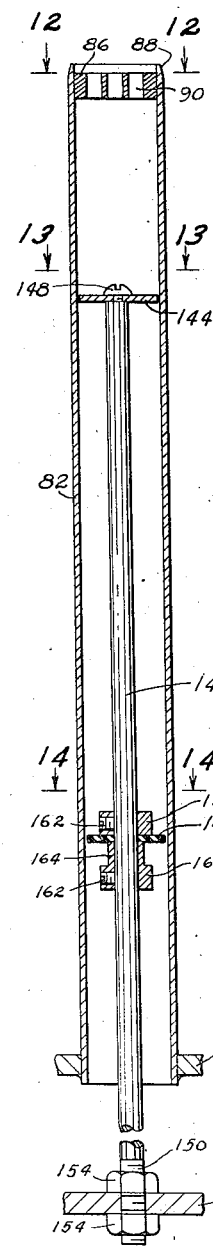
FIG_11
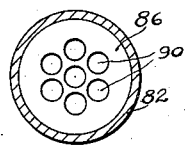
FIG_12
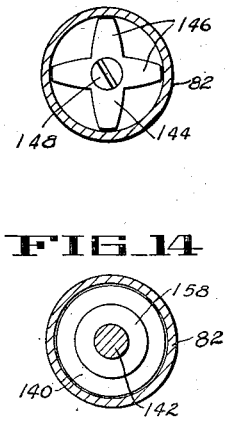
FIG_13
FIG_14
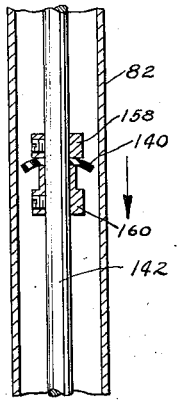
FIG_15
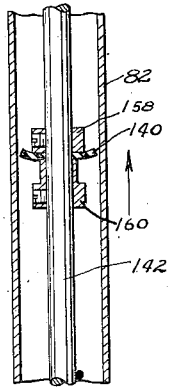
FIG_16
INVENTOR
BURTON C. COONS
BY Philip G. Minnie
ATTORNEY

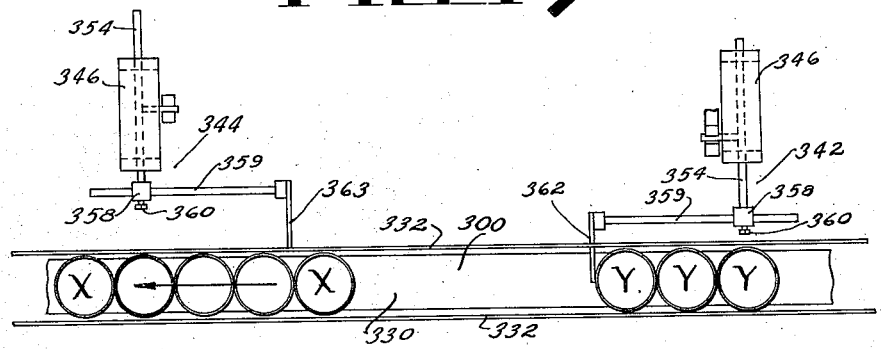
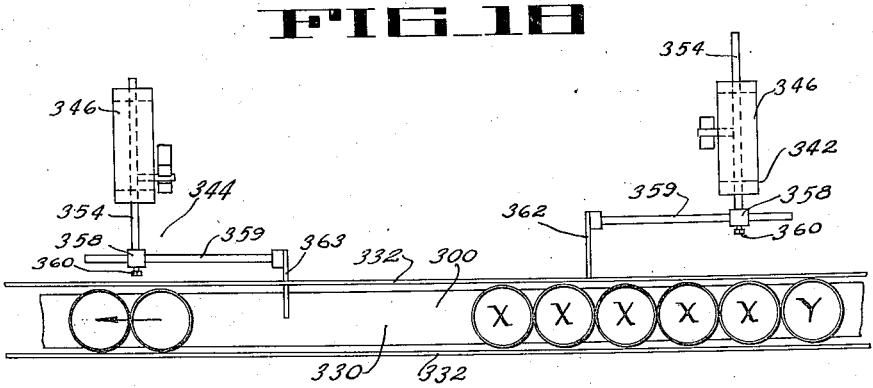
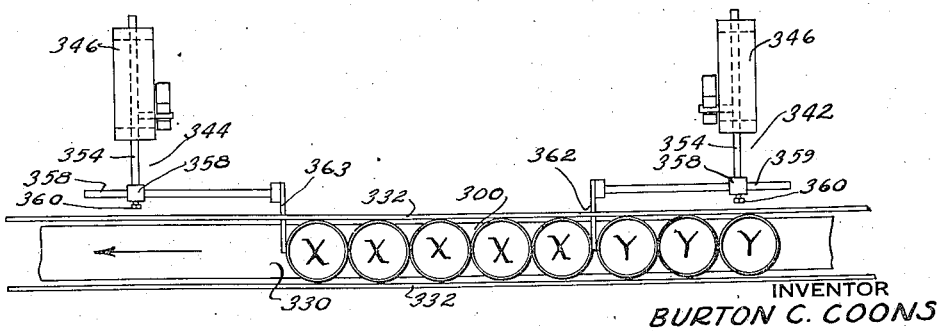

Patented Apr. 23, 1946

2,398,922

UNITED STATES PATENT OFFICE 2,398,922

METHOD AND APPARATUS FOR FEEDING FRUIT AND VEGETABLES

Burton C. Coons, San Jose, Calif., assignor to Food Machinery Corporation, San Jose, Calif., a corporation of Delaware Application July 24, 1942, Serial No. 452,194

37 Claims. (Cl. 134—25)

This invention relates to a method and apparatus for feeding fruit and vegetable pieces.

The invention is particularly concerned with feeding an accurate and predetermined number or count of small fruit.

For convenience, the invention will be described with respect to an embodiment for feeding Maraschino cherry halves to containers for receiving fruit cocktail or mixed fruits. However, it will be understood that other food products, for instance cherries, grapes and olives, in whole form, halves, or other sections and for instance, cubes or other sections of pineapple, carrot and beet, may be handled and that the invention therefore has general application.

In the following description and in the claims the terms fruit or fruits are used in their broad sense including the edible product of vegetable growth and the terms piece or pieces are intended to embrace fruits in their various shapes and forms for packaging. Also, the expression—place of use or delivery—shall include a container or position where a further operation is to be performed.

In the canning of fruit cocktail and mixed fruits, particular attention must be given to the number or count of pieces added per container. This is especially true when there is a scarcity of the fruit or the fruit is costly or has a special decorative value in serving, as in the case of Maraschino cherries. Short count brings complaints from the trade and over counting means a loss to the packer. It is also oftentimes desired to accurately proportion the contents of a container with different fruits or it may be essential to add a specific number of pieces of a certain fruit for flavoring or color.

In the foregoing circumstances, the practice heretofore has been to feed the fruit by hand, using a line of operators, each operator being expected to deposit fruit pieces in each container as it went by. By this practice it was thought that no containers would be entirely missed and that the opportunity for error would be materially reduced.

When it is considered that it is desired to supply 150 cans per minute with a predetermined number, for example 4 to 8 Maraschino cherries to each can, the enormity of the labor problem will be evident and it will be appreciated that errors readily occur. Manifestly, the practice is costly and cumbersome. Moreover, many fruits are difficult to handle by hand. Pineapple cubes are slimy and sticky and readily slip from the fingers and Maraschino cherry halves readily stick together and their flat sides adhere with considerable suction effect to a surface upon which they are dropped or pressed. Furthermore, when precooked or even slightly warmed above normal atmospheric temperatures the latter are soft and easily mutilated. Consequently, hand operations are also messy, injurious to the fruit, and invite breakdown in strict sanitary handling of the product.

The prior practices at best have been wholly unsatisfactory but so far as I am aware no one has heretofore provided a solution to this vexatious problem.

In accordance with the present invention, the foregoing objections and conditions relative to the packaging and count of fruit are completely overcome and for the first time a reliable method and apparatus for regularly feeding a predetermined count of fruit of the aforesaid character becomes possible and without, at any time, employing hand feed of the fruit pieces.

It is therefore the general object of the invention to provide a method and apparatus of the character under consideration whereby desirable and consistent results may be obtained and the enumerated difficulties as respects prior practices may be overcome.

Another object is to provide a method and apparatus for accurately feeding a predetermined number of fruit pieces from a mass thereof, which may be a promiscuous mass.

A further object is to provide a method and apparatus for performing operations of feeding fruit pieces to a place of use or delivery, in a rapid manner and without mutilating the fruit or touching the same by hand.

An additional object is to provide a method and apparatus for isolating fruit pieces from a promiscuous mass thereof and selectively feeding a predetermined number of those isolated to a place of use or delivery.

A more specific object is to provide a method and apparatus for isolating individual friut pieces from a promiscuous mass thereof.

Another specific object is to provide a method and apparatus for isolating fruit pieces from a promiscuous mass thereof in a liquid.

Still another object is to provide a method and apparatus for feeding a predetermined number of pieces of different fruit from separate promiscuous masses thereof.

Another object is to provide a method and apparatus for filling containers with a predetermined count of one or more fruit.

A further object is to provide a method and apparatus for feeding batches of fruit of predetermined count to one or more places of use or delivery and for selectively feeding the fruit with the same or a different count in each batch.

Moreover, it is an object to provide an apparatus that is simple in construction, easily assembled, in which the parts may be readily repaired or replaced, which will operate continuously, and in a uniform manner, which may be readily controlled, and will efficiently perform the functions for which it is indicated.

In its broad aspect, the invention contemplates isolating fruit pieces from a promiscuous mass thereof in a number at least the predetermined number it is desired to feed, and separating the predetermined number from those isolated. Preferably, individual pieces are separated from the number isolated and selected counts of these brought to a common place of use or delivery. It has been discovered that isolation of the fruit pieces may be best obtained by providing the promiscuous mass of the fruit pieces in a liquid body, such producing and better maintaining separation of the individual pieces and having a buoyant effect upon them. This is aided by agitation of the fruit pieces in the liquid which facilitates flotation of movement of the individual pieces of fruit and assures positioning of a requisite number of pieces for displacement from the mass.

Moreover, it has been found that positive withdrawal of the fruit pieces from the promiscuous mass is best accomplished by direct contact and penetration thereof, preferably utilizing a holding force, for instance suction, to attract and grip the fruit pieces within its influence. Advantageously, this procedure is readily controllable to avoid mutilation of the fruit pieces and also lends itself to providing pressure effects in the liquid body to obtain the desired agitation of the fruit. Of course, mechanical agitation is feasible and in the case of liquid-logged fruits may be desirable.

Since it is generally necessary to deliver the fruit pieces some distance from the mass, I have found it desirable to impale the predetermined number of pieces of fruit of those isolated from the mass, preferably individually, and to transfer the pieces to the place of use or delivery where they are stripped from their impaling means. This procedure is particularly desirable as it lends itself to a selective operation involving different counts of fruit and/or different varieties of fruit.

Inasmuch as the invention is particularly concerned with the packaging of fruit pieces, provision is also made for feeding containers in a manner whereby one or more containers may be held at a delivery station a sufficient interval of time to receive the contemplated charge of fruit pieces and further containers be positioned before the following charge reaches them; also, for feeding the same or different counts of fruit pieces to the different containers.

Certain objects and features of the invention have been set forth above and these and other objects will in part be obvious and in part pointed out in the subsequent detailed description, including the claims, and the drawings forming a part thereof in which an exemplified embodiment of the method and means for carrying out the invention has been described in detail for the purpose of illustration and not restriction.

It will be understood that the invention further comprises the various steps to be carried out; the relation and sequence of one or more of such steps with respect to each other or others; and apparatus embodying features of construction, combinations of elements and arrangement of parts, all as exemplified in the disclosure herein.

The sizes of certain parts have been exaggerated in the drawings for purposes of illustration. The disclosure, however, will be readily understood by those skilled in the art.

In the drawings:

Figs. 6 and 7 are further longitudinal sections taken at 5—5 of Fig. 2, Fig. 6 showing the fruit pick-up and transfer mechanism in discharge position and the fruit displacement members returning for a further charge of fruit pieces and Fig. 7 showing the former fully discharged and the latter in position about to displace further fruit pieces from the tank;

Fig. 8 is a partial transverse section taken through the pick-up pin and stripping rack of the pick-up mechanism at 8—8 of Fig. 2;

Fig. 9 is a longitudinal section taken through the pick-up pin and stripping mechanism and illustrating the pick-up pin in out or inoperative position, the section being taken at 9—9 of Fig. 2;

Fig. 10 is a view, partially in section, of a portion of a pick-up pin;

Figs. 11, 12, 13 and 14 are enlarged sections taken through a single fruit displacement element, Fig. 12 being taken in the direction of the arrows 12—12 in Fig. 11; Fig. 13 at 13—13 of Fig. 11 and Fig. 14 at 14—14 of Fig. 11;

Figs. 15 and 16 are enlarged broken sections of portions of a single fruit withdrawing element, Fig. 15 showing the piston during the liquid agitating cycle and Fig. 16 during suction cycle;

Figure 5:
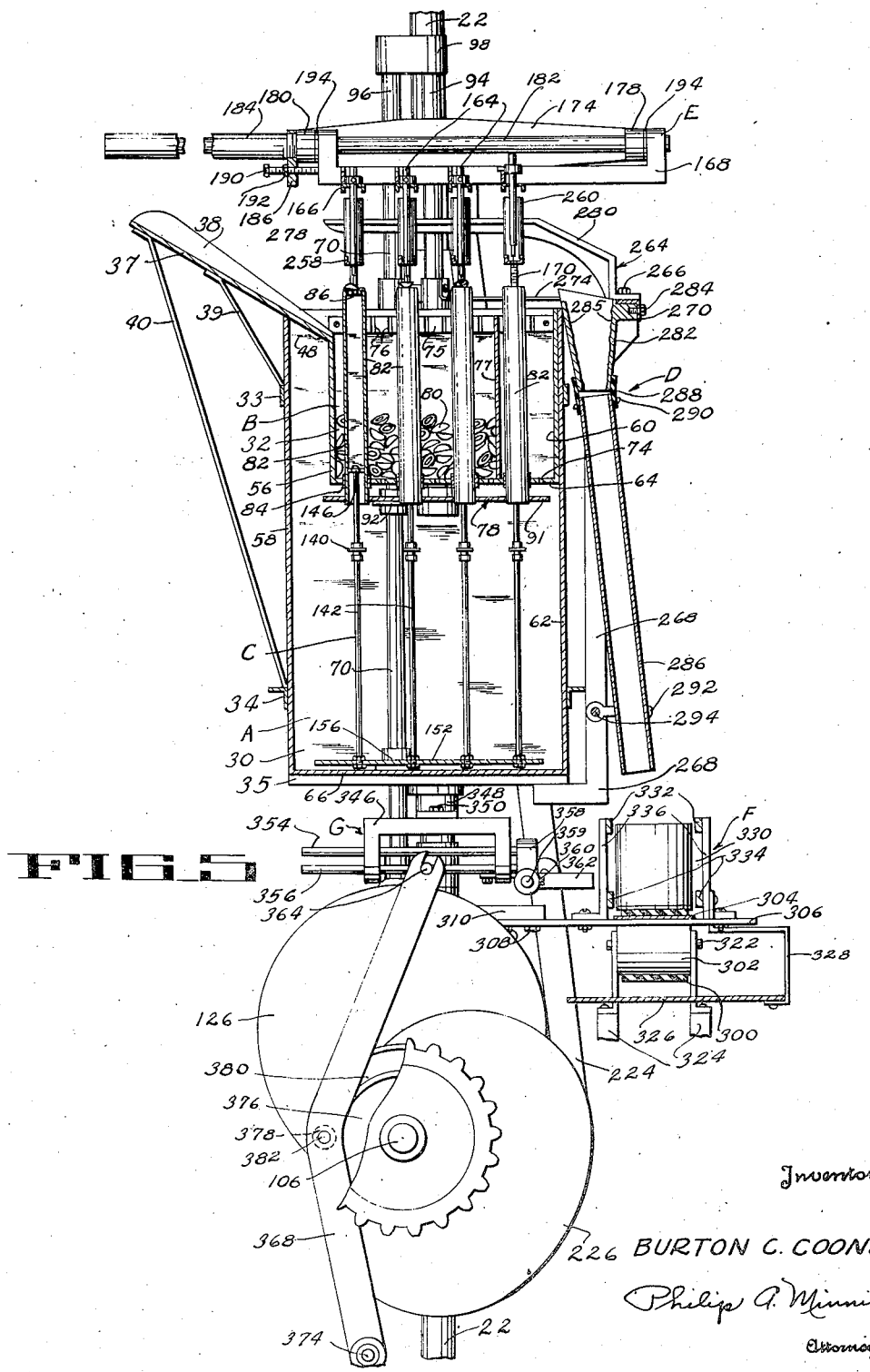
Fig. 5 is a longitudinal section taken along the line 5—5 of Fig. 2, and illustrating the apparatus in fruit pick-up position, one fruit displacement member only being shown in section.

Figs. 17–19 are schematic views of the container feed and stop mechanism; Fig. 17 showing the filled containers leaving the stop block; Fig. 18, a new group of containers entering the stop block and Fig. 19, the containers in filling position; and Fig. 20 is a partial longitudinal section similar to Fig. 5 showing a modification of the displacement mechanism.

Briefly stated, the exemplified embodiment of the invention generally comprises (see Fig. 5) a tank A, a cherry receptacle B in the tank A, a cherry displacement mechanism C, positioned in the tank A and receptacle B, a cherry delivery and feeding means D, a pick-up and stripping mechanism E positioned above the displacement mechanism and operable between this position and the delivery means E, and a container feed mechanism F and control mechanism G, below the delivery means D.

At the start of operations the receptacle B is filled to a desired level with a promiscuous mass of cherry pieces in a liquid, sufficient liquid being present to cover the cherry mass and to preferably separate the individual pieces and render them buoyant. The tank A is also filled with liquid to a similar level as the receptacle B and the liquid is preferably free to flow from one to the other. The displacement mechanism operates in the liquid in the tank and receptacle moving in and out of the cherry mass to isolate pieces therefrom. The pick-up mechanism E is timed to be in pick-up position when the cherry pieces are isolated and moved above the liquid level in the receptacle, and a predetermined number of cherry pieces are impaled thereby. The pick-up mechanism is then moved to the delivery means D where the cherry pieces are stripped from the former, passing into the delivery means from which they are discharged into containers positioned by the container feed mechanism F, in accordance with the operation of the control mechanism G.

Referring now specifically to Figs. 1-20 inclusive of the drawings, in which similar numerals designate similar parts of the structure and referring especially to Figs. 1 to 7 thereof, 20 is an elongated horizontal supporting base to the opposite ends of which are secured vertical posts 22. These posts extend the full height of the apparatus and serve as supporting members or masts between which to carry the operating mechanism. The posts are tightly fitted in the base 20, and additionally held by set screws 24. The upper ends of the posts are connected by a tie member 26, which is held in place by bolts 28 and forms a rigid supporting frame with the base and posts.

Figure 4:
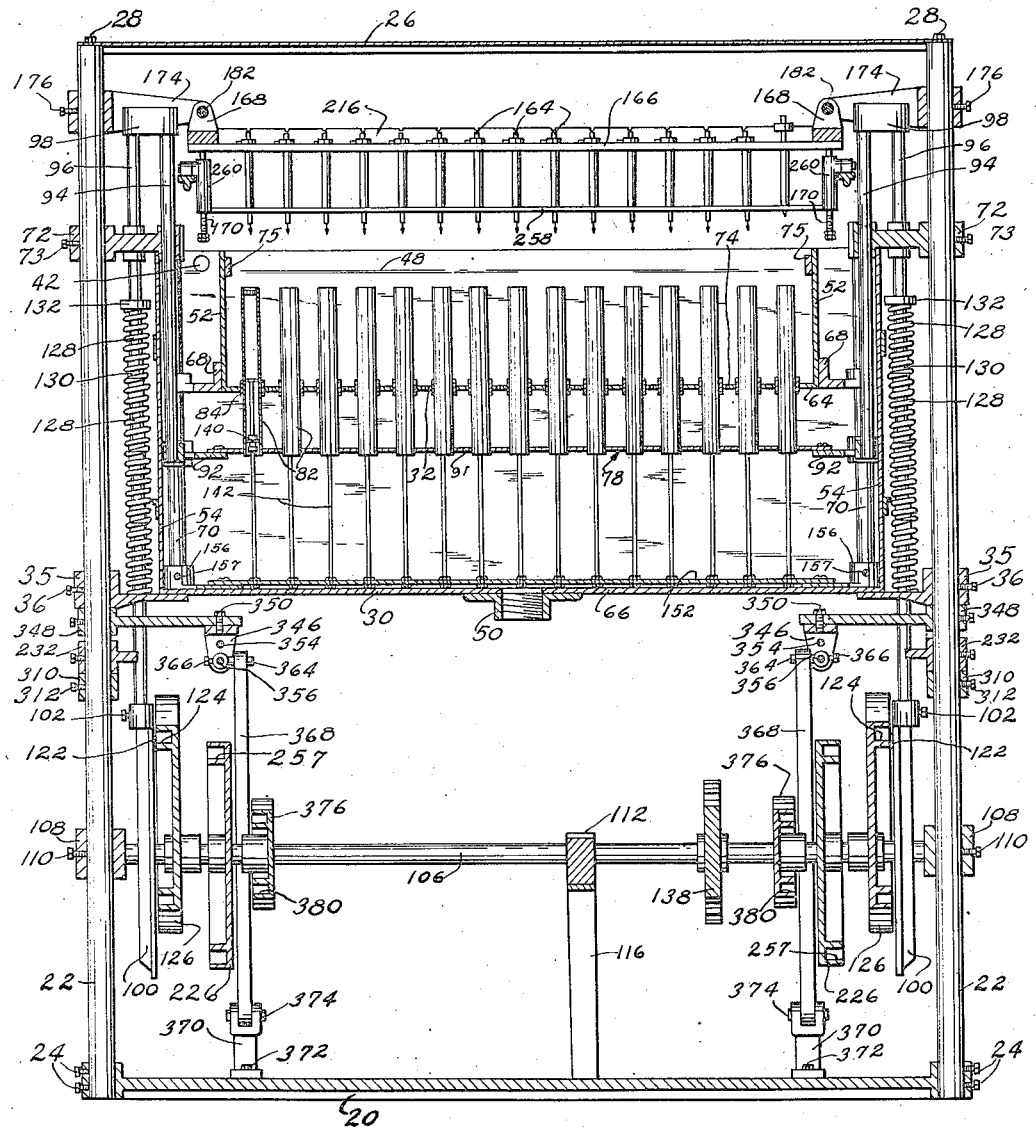
Fig. 4 is a transverse section taken as indicated by the arrows 4—4 in Fig. 2, one of the fruit displacing members being shown in section.

As seen in Figs. 4 and 5, two elongated tanks, an outer tank 30, and an inner tank 32, which may constitute a receptacle in the tank 30, are carried in the upper half of the space between the posts 22. Both tanks are rectangular in shape and open at the top. The outer tank is stiffened with upper and lower straps 33 and 34 respectively, which extend around its periphery to reinforce it and has supporting brackets 35 fixed to its opposite ends adjacent the bottom thereof as by welding. These brackets are adjustably mounted on the posts 22 to which they are locked by set screws 36 when the tank is located at the desired level. The inner tank serves as a fruit reservoir and has a pouring apron 37 extending the length of its front edge and projecting outwardly at an acute angle over the tank 30. The apron has upwardly turned ends 38 and is welded to the front edge of the tank 32 and braced by brackets 39 and 40 to the straps 33 and 34 respectively of the tank 30. Both tanks receive liquid to facilitate functioning of the cherry displacement mechanism hereinafter described.

At one end of the outer tank 30 is an overflow outlet 42 (Fig. 4) and an elbow and pipe 44 and 46 respectively (Fig. 3) whereby liquid in the tanks may be maintained at the level 48 (Fig. 4). In the bottom of the tank 30 is a threaded outlet 50 from which the liquid may be drained when emptying or cleaning out the tank. In operation of the apparatus this outlet is closed by a suitable plug or it may be connected by a pipe line with valve connection. If desired, the outlet 50 may be used as an inlet and a constant flow of liquid be provided during operation of the machine the same overflowing at the outlet 42.

The inner tank or receptacle 32 is shorter, narrower and of lesser depth than the outer tank 30. As shown in Fig. 4, it is located in the tank 30 so that its ends 52 are spaced from the ends 54 of the tank 30. Moreover, as illustrated in Figs. 5, 6 and 7 its front side 56 is spaced from the front side 58 of the outer tank, while the rear side 60 lies close to the rear side 62 of the outer tank. The upper edge of the inner tank 32 is substantially on a level with the outer tank 30 and the bottom 64 thereof is sufficiently distant from the bottom 66 of the outer tank to provide space for the further mechanism to be described. The inner tank 32 is supported in the aforesaid position by end brackets 68 (Fig. 4) secured to the tank as by welding, which in turn are supported from and are adjustably mounted and locked by set screws on overhanging rods 70 (Figs. 2 and 4) which project downwardly into the tank 30 between the end walls 52 and 54 of the two tanks at each end of the machine. These rods find their support in brackets 72, from which they overhang. The latter brackets are adjustably mounted on the posts 22 and set screws 73 lock them in position.

Figure 2:
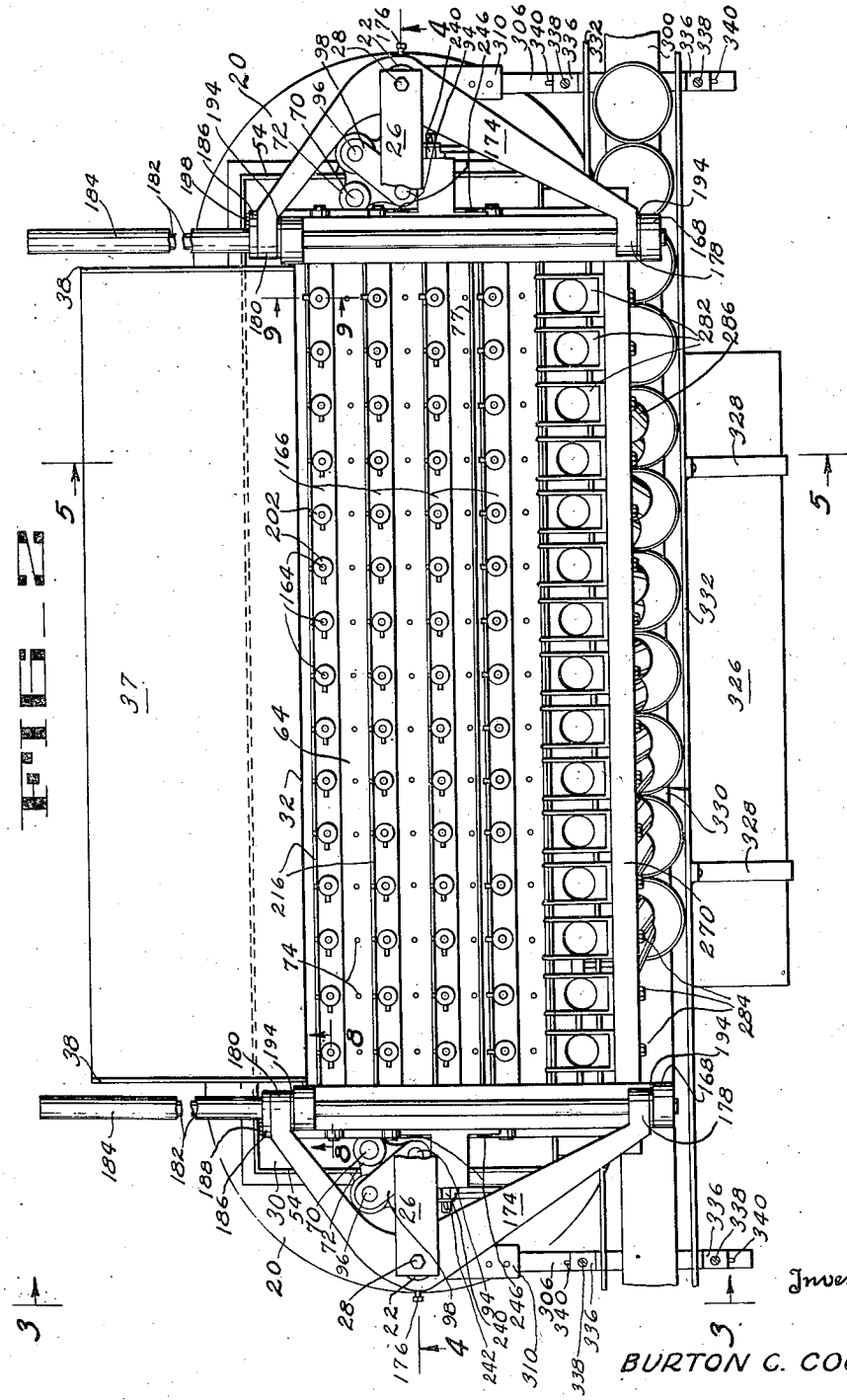
Fig. 2 is a top plan view of the apparatus also showing a group of containers in position for receiving fruit.

The inner tank 32, as shown in Figs. 2 and 4, has a plurality of openings 74 whereby liquid may pass from the outer to the inner tank or vice versa and the liquid in both tanks be maintained at a common level. Moreover, secured interior of the tank 32 at each end, adjacent its upper edges, as by welding, are bars 75 (Fig. 5) having vertical slots 76. One or more removable partitions 77 may be slid into these slots to reduce the active volume of the tank 32 and thus keep cherries clear of certain mechanism not in use. Moreover, one or more partitions may be used to provide compartments to handle different fruits simultaneously.

*Cherry displacement or feeding mechanism*

A feature of the invention resides in the displacement or carrying mechanism for displacing and removing cherry halves from the tank 32 and which is generally designated by the numeral 78 in Figs. 4, 5, 6 and 7. The mechanism is arranged for vertical operation in the tanks 30 and 32, penetrating the mass of cherry pieces 80 placed in the tank 32 and removing cherry pieces therefrom. The member 78 includes a plurality of similar elongated hollow cherry displacement members, for instance the carrying and feeding tubes 82, slidably mounted for vertical movement, in suitable bearing bushings 84 fixed in the bottom face 64, of the inner tank 32. The tubes 82, are preferably open at their lower ends where they project into the tank 30. An enlarged detail of the tube 32 is shown in Fig. 11. Fixed slightly inwardly from the upper end of the tubes 82, are perforated pieces 86, which form a cup-like cherry engaging seat or recess with the projecting tapered lip 88 of the tubes. The pieces 86 have openings or perforations 90 through which liquid may be drawn into or exhausted from the tubes. It will be observed that the openings are arranged with one at the center of the tube and the others around a circle concentric thereto. As shown for instance in Figs. 4 and 5, the tubes are rigidly held adjacent their lower ends by a carrying plate 91 which ties all the tubes into a single acting member.

It will be understood that the number of fruit feeding tubes are optional, such being solely limited by practical considerations and the number of cherry pieces to be fed at any one time. Thus, as shown in Fig. 2, for example, the tubes have been arranged in 15 parallel longitudinal rows of four each.

The carrying plate 91 is supported on lift brackets 92 which are secured to the lower ends of vertical lift rods 94 (Figs. 2 and 4). These rods are located on the transverse center line of the group of tubes and between the respective adjacent end walls of the tanks 30 and 32. The rods, moreover, are slidably mounted on brackets 72, previously mentioned, fixed to the posts 22 adjacent the upper edge of the tank 30.

Also, slidably mounted in the brackets 72, on each side of the machine are cam rods 96, which raise and lower the cherry displacing member 78 by actuating the lift rods 94. The upper ends of the cam rods are rigidly connected with their respective adjacent lift rods by connecting links or bars 98 in which they are rigidly held. The lower ends of the cam rods 96 pass through clearance holes in the brackets 35 and are rigidly connected to a slotted guide bar 100 (Figs. 1, 3 and 4) as by set screws 102. The slots 104 (Fig. 3) of these bars preferably have a length at least equal to the total movement of the cherry carrying member 78, and fit over a horizontal drive shaft 106, with which they are slidably engaged for guiding. It will be observed that the drive shaft axis is vertically in line with the upper bearing of the lift cam rod, in the bracket 72, so that this member of which the slotted guide bar is a part moves in a straight path.

The drive shaft 106 is rotatably journaled in right and left bearing blocks 108, adjustable on the posts 22 and held by set screws or pins 110. The shaft is further journaled in a central pillow block 112, secured by bolts 114 (Fig. 1) to the brackets 116, mounted upon the base 20 by bolts 118.

Figure 3:
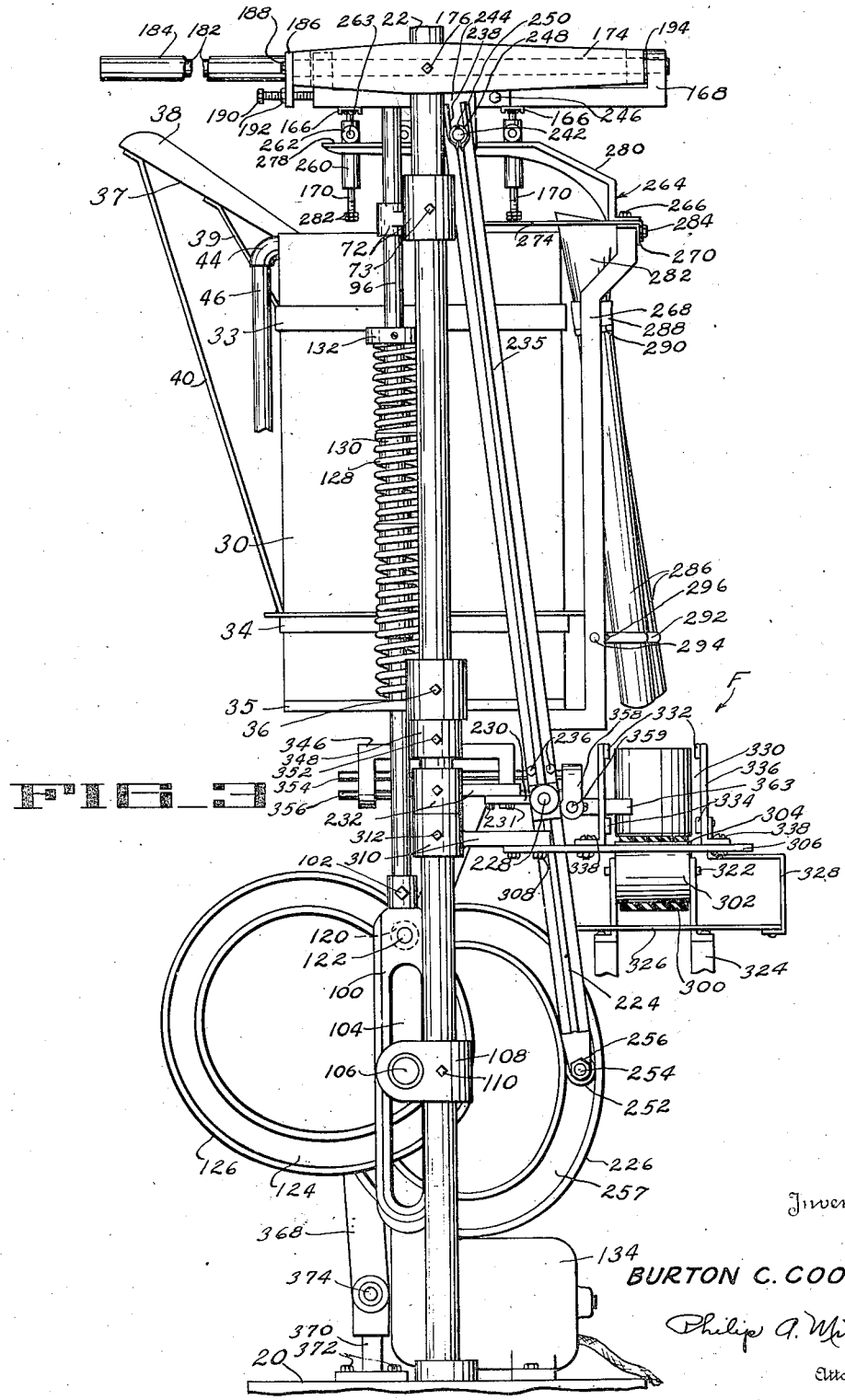
Fig. 3 is an elevation of the right side of the apparatus taken as indicated by the arrows 3—3 in Fig. 2, the operating mechanism being shown in fruit displacement position.

Projecting laterally from the guide bars 100, are cam rollers 120 shown in the dotted lines in Fig. 3, which are rotatably mounted upon shouldered studs 122, rigidly secured to the guide bars 100. These rollers engage in cam tracks 124 of the right and left lift cams 126 fixed to the shaft 106. The cams 126 raise and lower the rollers 120 which in turn move the interconnected lift cam rods 96, lift rods 94 and cherry displacing member 78 with its tubes 82.

In order to reduce the operating load upon the lift cams when raising the cherry carrying member 78, sectional compression lift springs 128 are provided over suitable guide sleeves 130 on the lift cam rods 96. The adjacent ends of the spring sections abut each other to form a long compression spring having little or no side deflection in operation. The uppermost spring section bears against collar 132 pinned to the rod 96 and the lower section bears against stationary tank bracket 35. In operation, the springs are compressed when the cherry displacing member 78 moves down, at which time this compression is the only working load on the cam. When the direction of movement is reversed the force stored in the springs helps the cams 126 lift the cherry displacing member.

The lift cams 126 are driven through shaft 106 from a suitable source of power, for instance, an electric motor 134 having a built-in reduction gear and an output pinion 136 (Fig. 1) which engages a gear 138, fixed to the drive shaft 106.

An important feature of the invention is to provide for agitation of the cherry mass 80 to obtain a more favorable positioning of the cherry pieces in relation to the displacement member; also for bringing cherry pieces into the path of and under the influence of these members and, moreover, to provide for forcibly retaining cherry pieces to these members until a short time before their removal therefrom and without mutilating them. While it will be understood that these functions may be performed by separately operating elements, all are preferably obtained, as shown in the illustrated embodiment through the cooperative relative reciprocatory action of the displacement tubes 82 and pistons 140 (Fig. 11) one of which is positioned to operate in each tube. As shown in greater detail in Fig. 11, each piston 140 is fitted over a piston rod 142 at a point distant from its upper end. A guide washer 144 having, as shown in Fig. 13, four tooth-like radial projections 146 producing the general shape of a cross is centered and secured to the upper end of the piston rods 142 as by a screw 148. The washer 144 is positioned in the tube 82 with its projections slidably fitting the inner wall of the tube.

The lower end of the piston rod has a threaded portion 150, which extends through a tie-plate 152 to which the rod is secured by check nuts 154 on each side of the plate. The threaded portion is of sufficient length to allow for adjustment of the rod, in relation to the tie-plate. All of the piston rods are secured in this manner to the tie-plate 152 which thus makes a single operating unit of all the pistons. The tie-plate is fixed as by welding to adjustable end brackets 156 (Fig. 4) which are positioned at the lower ends of the overhanging stationary rods 70, adjacent the bottom 66 of the tank 30 and are fixed in position by suitable set screws 157. It will be observed that the pistons are therefore also stationary relative to the tank and frame of the apparatus and that the tubes 82 move relative to the piston.

The piston 140, preferably comprises a relatively soft, flexible washer of highly elastic and durable material, for instance gum rubber or a rubber latex, or other synthetic gum or plastic of similar elastic properties. Washers punched from an amber colored sheet gum rubber, as made by the Goodyear Rubber Company, have performed satisfactorily. The washer is preferably clamped between upper and lower collars 158 and 160, respectively, which form a head therefor and may be locked in any position along the piston rod 142, by set screws 162. The lower collar has a shoulder portion 164 of reduced size bearing against the washer and in the disclosed embodiment this portion is of smaller diameter than the collar 158 where it abuts the upper portion of the piston. It will be observed that the piston comprises in effect a rigid central portion and a flexible concentric peripheral portion.

The exemplified cherry displacing mechanism is operated by rotation of the cams 126 which transmit vertical movement during a portion of their rotation, to the tubes 82 through the lift rods 94, springs 128 and carrying plate 91. The endless tracks 124 of the cams give the tubes a reciprocatory motion with a dwell or dead period between changes in direction of motion.

Assuming that liquid is in the tanks 30 and 32 and that a mass 80 of cherry pieces is in the tank 32 and further, assuming a position of the tubes 82 at the end of their upward movement, as shown in Fig. 5, which corresponds relatively speaking to the maximum outstroke of the piston 140, liquid in the tank 30 may then flow freely into the tubes to the level 48, the pistons 140 having then passed their effective positions. In this position the pistons are outside the tubes in the liquid below the tank 32, the upper ends or cherry carrying or engaging seats 86 of the tubes are completely out of the liquid, and the cross-shaped guide washers 144 remain in engagement with the tubes, but the liquid flows through the spaces between the projections 146 thereof. In this position of the tubes 82 the cherry pieces are settled in the tank and are relatively quiescent though buoyantly arranged in the liquid in the space between the tubes.

On the return or downward movement of the tubes 82, which corresponds relatively speaking to the instroke of the piston, the cherry engaging seats 86 pass below the level 48 of the liquid in the tank 32 and when the tubes have reached the position shown in Fig. 6 the pistons have entered the tubes, the guide washers centering the pistons in the relative movement that has taken place. The pistons are now in effective position, i. e., the lower ends of the tubes are now substantially closed and continued downward movement of the tubes produces some agitation of the quiescent cherries and in particular causes the pistons to apply pressure against liquid in the tubes, whereupon jets of the liquid are forced through the openings 90 of the cherry engaging seats 86 and projected into the mass of cherries 80 and liquid in the tank 32. These jets produce a positive disturbance or agitation of the liquid in the tank 32 and a stirring and flotation of the individual cherry pieces of the mass thereof in the liquid. The action has the distinct advantage of causing the cherry pieces of the mass thereof to float over and into position or range of the cherry engaging seats 86 as the tubes pass below the uppermost level of the mass of cherries.

Agitation of the cherry mass continues until the down stroke of the cherry displacement tubes is completed at which time the tubes will be substantially as illustrated in Fig. 7, from which it will be observed that the cherry engaging seats of the tubes are then well below the surface of the promiscuous mass 80 of cherry pieces, which has now closed in above the same.

The cams 126 that operate the cherry displacement mechanism now produce a reversal or upward movement thereof causing liquid behind the pistons 140 to be displaced and exhausted from the tubes, thus producing a vacuum or suction effect at the cherry engaging or perforate seats 86 of the tubes and upon any liquid ahead of the piston. When this occurs there is also a rapid influx of liquid through the openings 90 of the seats, to take the place of liquid exhausted from the tubes and accordingly the suction effect is extended into the cherry mass adjacent thereto by the streams of liquid drawn into the tubes through the openings. Thus, any cherry pieces which may lie in the direct path of the moving tubes or within sufficient influence of the suction effect are drawn into the path of the tubes and upon contact with the seats 86 cover more or less of the openings 90 in the seat 86 and are held thereto by the support given thereby and by the partial vacuum created ahead of the piston.

Due to the arrangement of openings 90 in the cherry engaging seat 86 it is believed that maximum attraction occurs at the central portion of the seat and that the initial cherry piece is drawn to this position or substantially so and any others arranged themselves in diverse positions at the marginal portion of the seat. This conclusion is reached after many operations of the tubes during which each tube emitted from the liquid with at least one cherry piece centrally of the seat or having an edge portion over the central region thereof.

The suction effect or holding force continues until the displacement tubes reach a position where the pistons leave the tubes, at which time liquid from the tank passes the pistons and breaks the suction effect. During any remaining movement of the displacement tubes all the cherry pieces lying for their greater part within the cupped cherry engaging seat will remain there. The remainder will fall back into the liquid or be floated off, dependent upon the position of the tubes at the time suction is broken. The suction breaking point will be governed somewhat by the character and size of the cherry pieces being handled and by the requirements of the operation but preferably is made to occur just as the cherry engaging seat 86 reaches the surface of the liquid in tank 32. It will be observed that this point may readily be changed by merely shifting the piston on the piston rods through the means provided.

The size of the cherry withdrawal tubes and the size and number of openings in the cherry carrying seat are also factors determined by the character of the fruit to be handled and nature of the operation. For example, in handling of cherry halves, it is preferred that the tubes not be too large, in order to avoid too much flow of liquid and piling up of cherry pieces, which may make it difficult to remove a predetermined number in the subsequent operations. On the other hand, the tubes should not be too small, otherwise an insufficient volume of liquid may pass through the tubes and the suction effect may be insufficient to prevent cherry pieces from being knocked off during continued movement of the tubes as they pass other cherries in the liquid mass of the tank.

In the handling of Maraschino cherry halves, I have found that displacement tubes having an internal diameter of about one and one quarter inches and having, as shown in Fig. 12, seven holes about one-eighth inch in diameter and arranged with one in the center and six about the center one, give satisfactory results.

The number of cherry halves adhering to tubes of this size, that is, remaining upon the cherry engaging seats at the upper end of the stroke is indeterminate, but experience in many continuous runs has shown that this number will vary with the size of the cherries and the suction effect produced in the tubes. Generally, the number is between 1 and 3 and may be a fixed number over long runs. However, as previously stated, there is always at least one cherry half displaced by each of the tubes and that one is positioned so that a portion of the cherry half is over the center portion of the cherry engaging seat 86. Accordingly, where continuous faultless count of cherry halves is desired it is preferred that the cherry pick-up mechanism be arranged to remove a single cherry half in each operation of the tubes. Any others may be returned to the cherry receptacle on the down stroke of the tubes.

Another important feature of the fruit displacement mechanism is the character and size of the pistons. As previously stated, it is preferred that the marginal portion of the piston be of highly elastic and resilient character, for instance be made of gum rubber of the type disclosed. Moreover, although it would be expected that the piston should fit the tube, I have found it preferable to make the normal size (its size before assembly in the tube) of the piston slightly under the inside diameter of the tube, about one-sixty-fourth of an inch wall clearance having been found in practice to be preferable and satisfactory. Thus, in a tube having a one and one quarter inch internal diameter, the preferable size of the piston is one and seven-thirty-seconds of an inch.

A piston of the aforesaid character, not only acts to produce the liquid agitation and suction effects described above, but furthermore serves as an automatic valve-like relief device to smooth out the action of the piston in either of these agitation or suction operations and to facilitate holding of fruit pieces without mutilating them or drawing them into the tubes, particularly if the pieces be soft. It has been found that even in a small size displacement tube the pressure and suction effect is considerable and that by making the piston somewhat under the size of the tube, the agitation and suction effects may be lessened to a reasonable amount without losing them altogether and the possibility of mutilating soft fruit pieces be also avoided. The success of this operation is believed principally attributable to the fact that a flexible piston of the aforesaid character assumes a shape somewhat as shown in Fig. 15, in the down or pressure stroke of the tube and assumes a reverse position as shown in Fig. 16 in the up or suction stroke of the tube.

It will be appreciated that when, during the suction operation, one or more cherry pieces are drawn to the cherry engaging seat one or more of the openings in the cherry engaging seat will become partly or wholly covered and there is a tendency for the suction effect to build up by reason of the reduction in liquid passage area caused by such stoppage. Under such conditions, it is believed that the piston, as shown in Fig. 16, merely flexes a slightly greater extent in the upward direction and permits a greater flow or leakage of liquid by the same, thereby automatically balancing the loss of liquid input at the seat and reducing the suction effect to a safe amount. Similarly, if in the pressure stroke of the cherry displacement tubes the resistance at the seats builds up so as to tend toward stronger jets, such is released by a further downward flexing of the piston, as shown in Fig. 15. By changing the size of the piston engaging shoulders of the piston heads 158 and 160 for the particular fruit being handled, one side may be permitted to flex more readily than the other and in this way the relief valve effect may be adjusted to suit the suction and pressure conditions of operation.

Thus, the disclosed piston embodiment not only acts to produce the liquid jets for agitating the cherry mass and a suction effect for drawing and holding cherry pieces upon the cherry engaging seats, but also serves to smooth out these effects in operation of the cherry displacement tubes in their up and down strokes and avoid mutilation of the cherry pieces, especially when the mass 80 contains soft pieces. Moreover, the described cherry displacement mechanism also thus provides a means for isolating or displacing from the mass 80 the cherry pieces in the tank 32, an indeterminate or small number of cherry pieces always numbering at least one.

Cherry transfer or pick-up and count mechanism

A further important feature of the invention is the transfer or pick-up and stripping means E provided for removing from the displacement tubes and transferring to a place of use or delivery, a predetermined number of the cherry pieces isolated by such tubes from the promiscuous cherry mass.

It has been previously stated that in handling cherry halves with the disclosed embodiment of the invention there is always at least a portion of one cherry piece over the center of suction which by reason of the tube structure in the disclosed embodiment places it over the center portion of the tube. Moreover, it appears that the number of cherry pieces displaced in a single movement of a tube does not alter this result. Where more than one cherry piece is removed the remainder appear to arrange themselves haphazardly around the central one upon the seat of the tube. Some may rest on their rounded faces, others upon the flat portion thereof, and still others may be held edgewise to the tube by the suction effect and may subsequently alter such position when the suction is released.

In view of the above phenomenon, it is preferred, in order to secure the highest accuracy of count, to remove a single cherry piece from each tube in every operation of the transfer or pick-up mechanism. Moreover, it is preferred that the pick-up mechanism be arranged to remove the centrally positioned cherry piece referred to above.

Any suitable mechanism may be provided for picking up the individual cherry pieces from the seats 86 of the displacement tubes 82. In the preferred embodiment such mechanism is suspended over the displacement tubes and is mounted for reciprocatory movement in a horizontal plane to move the same from pick-up position over the tubes to the discharge position at the rear side of the machine. The transfer mechanism comprises pick-up elements generally designated by the numeral 164 (Fig. 10) which are in the nature of freely operating, gravity acting members having a spear-like pin with a barb point for engaging the cherry pieces by impact and penetrating them. Once impaled the fruit pieces remain fixed to the pins until forcibly removed. In the instant embodiment the cherry pieces are impaled by moving the tubes 82 carrying the cherry pieces into the path of the pins which then are stationary relative to the tubes, the cherry pieces impacting with the pins and becoming impaled thereon. Each pick-up pin is sufficiently weighted to obtain the proper impact and a sharp penetration thereof into the fruit and, furthermore, is movably mounted vertically to give freely after impact takes place and a single fruit piece has been impaled by the barb.

Figure 1:
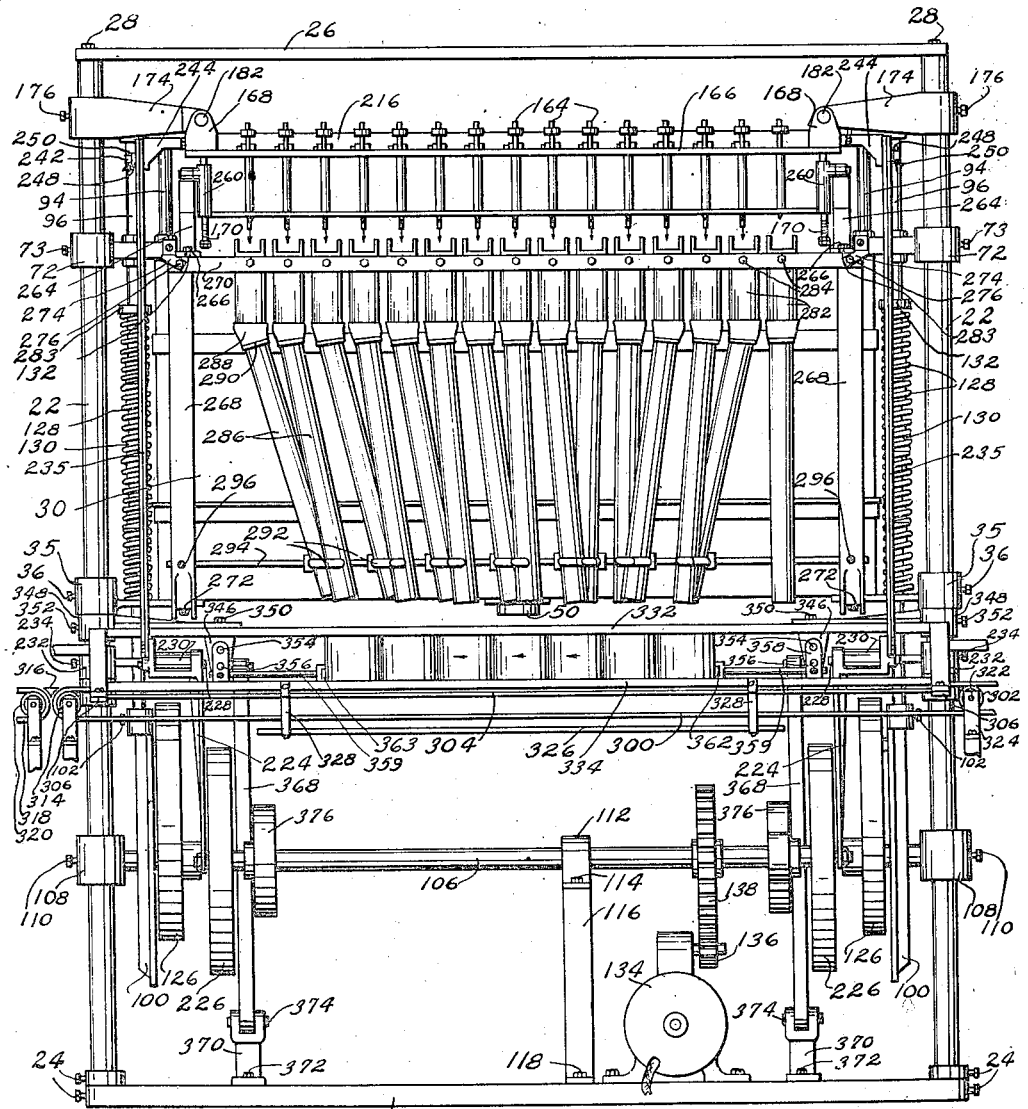
Fig. 1 is an elevation of the rear or fruit delivery side of the apparatus of the invention showing containers in position for receiving a fruit charge.

A plurality of transfer or pick-up elements are carried in racks 166 (Fig. 9) of U-shaped section that extend transversely of the machine, as shown in Fig. 1. In the disclosed embodiment four racks (Fig. 2) are provided corresponding to the number of transverse rows of displacement tubes 82. The pick-up elements 164 are, moreover, spaced apart on the racks a distance corresponding to the transverse spacing of the displacement tubes 82, and the racks are spaced apart distances corresponding to the longitudinal spacing between the tubes.

The pin racks are supported directly over the tank 30 between U-shaped longitudinal end brackets 168 (Figs. 3 and 4) to the under side of which they are affixed as by welding and/or by the stripper guide rods 170 (Fig. 8), further reference to which will be presently made, which rods are threaded into the brackets and carry lock nuts 172, that clamp the racks with respect to the brackets.

The brackets 168, are movably supported at each end of the machine from spider members 174 (Fig. 2), the latter being adjustably secured to the posts 22 by set screws 176 for vertical positioning. The spider arms project inwardly and divergently over the tank, terminating in the bearings 178 and 180 in which longitudinally extending rods 182 are slidably supported in a horizontal plane. These rods carry the aforementioned pin rack brackets 168, one leg of the brackets being fixed to the ends of the rods 182 at the rear side of the machine, and being positioned beyond the spider arm bearing 178, and the other leg of each bracket being fixed to the respective rods at a position between the spider bearings. The rods 182, as will be seen in Fig. 2, extend through the spider bearings 180, at the front side of the machine, a sufficient distance to provide for the longitudinal movement of the pin racks from pick-up to discharge position.

In order to protect persons from injury, by the projecting rods when in motion, stationary tubes 184 are loosely fit over the rods and are threaded at their inner ends into brackets 186 secured as by bolts 188 (see Fig. 2) to the bearings 180 of the spider members 174. As best shown in Fig. 3, each bracket 186 also carries an adjustable screw stop 190, which may be locked by a check nut 192. The purpose of these stops is to make sure that the pick-up mechanism comes to a dead stop with its pick-up elements 164 axially aligned with their corresponding cherry displacement tubes 82 positioned below when moved into pick-up position or with such position of the tubes as is deemed best for the pick-up operation. In order to cushion the brackets 168 at each end of their travel, resilient washers 194 (Fig. 2), for instance of rubber, are located on the rods 182 between the spider bearings and the adjacent legs of the brackets 168.

The pick-up elements 164, as shown in enlarged view in Figs. 8 and 9 are carried in elongated tubular sleeves 196, which project downwardly, normal to the racks 166. The upper ends of the sleeves are fitted into receiving recesses in the racks, and may be rigidly welded thereto and their lower ends are free. These sleeves guide the pick-up elements in their operation.

The pick-up elements (Figs. 8 and 10) comprise a pin holder 198, a pick-up pin or spear 200 and a collar 202. The pin holder is slidably fitted in the sleeve 196 and has a neck portion 205 of reduced size to reduce the weight of holder and the extent of friction surface in the tube. The holder also has a shank portion 206, the end of which is suitably bored to receive the staff 208 of the pick-up pin. The pin has a slender neck portion 210, which terminates in a barb 212, the back shoulder of which prevents the cherry piece from falling off the pin once it penetrates the same. In assembling the pins in the holders the distance from the barb 212 to the lower end of the shank portion 206 is preferably set so that only a single piece of fruit will be penetrated. By reason of this setting only the topmost cherry will be impaled where several are piled one on another on the seat 86 of the displacement tube 82.

The collar 202 is adjustably secured to the upper end of the pin holder as by the set screws 214. It will be observed that the collar rests upon the rack 166 and determines the limit of downward movement of the pin. It also serves to weight the pin. Additional weight may be obtained by adding more collars. In operation the collar 202 is preferably located to allow for sufficient relative movement of the tube 82 and pick-up pin 200 to carry the cherry piece into impact with the pick-up pin and be impaled thereby, allowance being made for some give by the cherry piece. Generally, the collar may be set so that the barb 212 just falls short of touching the seat 86 of the displacement tube 82 when the latter is at maximum up position.

It will be observed that the lower end of the shank portion 206 of the pin holder has a curbed surface that tapers down to where the shank meets the neck portion 210 of the pick-up pin. This shaping is an important feature as it prevents cherry pieces which are not in position to be impaled, but which are positioned edgewise on the carrying seat 86 of the displacement tube, and in position to contact the shaft of the pin or the shank of the holder from cushioning or entirely preventing the pick-up pin from reaching or impaling a cherry piece it is desired to remove lying flatwise in the central portion of the carrying seat. If the shank portion of the holder terminated, for instance, in a pronounced shoulder such could strike an edgewise positioned cherry piece and prevent the pick-up pin from getting within reach of the cherry piece in its path and which it was desired to impale. Of course, if the pin were positive in its motion instead of floating it would continue its movement to reach the cherry piece to be picked up but might crush and mutilate the edgewise positioned piece in its path intercepted by the shoulder portion of the pin holder.

The described taper permits the pick-up elements to cam any interfering cherry piece clear of the pin holder shank and enables the pin to travel the distance necessary to impact the cherry piece to be removed and impale the same. The taper also aids in avoiding any substantial cushioning of the force of impact in the case of gravity acting pins, that would prevent the pin from penetrating the cherry piece to be picked up. The mass of the pick-up pins, should of course be selected to produce sufficient impact between the cherry pieces and pins, due consideration being given to the rate of movement of the displacement tubes and the relative distance the pins must move.

It will be understood that all of the pick-up pins need not be operated at any one time but that certain pick-up pins in each or any row of pins may be selected for operation in order that a predetermined number of cherry pieces may be delivered to the place of use or delivery. Thus, as illustrated in Figs. 2, 5, 6 and 7, it may be desired to have an entire transverse row of pins out of operation. In order to render one or more pick-up pins inoperative, each pin rack is provided with a longitudinal strap or bar 216 (Figs. 8 and 9) wihch is located between the end brackets 168 and stands edgewise upon the rack 166, to the upper surface of which it is secured as by welding. The upper or free edge 218 of this bar is provided with spaced slots 220 positioned at distances equal to the transverse center distances between the pick-up elements. Moreover, the stop collar set screws 214 of the collar 202 have a long shank portion 222. The bars 216, are also positioned adjacent the pick-up pins and to remove the latter from operation it is merely necessary to raise the pick-up pins so that the set screw is above the upper edge 218 of the bar 216, rotate the pick-up pins so that the set screw 214 is normal to the face of the bar 216 and above the slot 220 and drop the shank 222 of the set screw into such slot. The pick-up pins will then assume the position as shown in Fig. 9. Thus it will be evident that any one or more of pick-up pins may be selectively and quickly taken out of operation when required or to be replaced. This feature is a particularly desirable one during canning operations to enable the operator to make a quick change over from the number of pieces being fed at any time to a greater or lesser number. It will be understood that Maraschino cherries, before reaching the canner are graded in 5 or 6 sizes so that some barrels received by the canner may contain one size and others a different size. In starting a new barrel containing cherry pieces of a different size it becomes necessary for the canner, in order to meet the weight standards of the canning trade, to change the number of cherry pieces being fed to each container. It will be manifest that such change is a simple matter with the gravity acting pick-up pins described above.

In the described embodiment of the invention, all of the pick-up pins are simultaneously moved from their pick-up position immediately above the cherry displacement tubes to a place of delivery or discharge, by driving the pin rack supporting brackets 168 through rocker arms 224 at each side of the machine, the latter being operated by cams 226, also located on each side of the machine and secured on the drive shaft 106, this structure being best seen in Figs. 1 and 3.

The rocker arms 224 are pivotally journaled on shafts 228 (Figs. 1 and 3) fixed in the bearing brackets 230 which are secured by bolts 231 (Fig. 3) to brackets 232, the latter being adjustably secured to the posts 22 by set screws 234. The rocker arms have offset leg portions 235 in order that the arm may clear the displacement tube lift cam. The hubs of the rocker arms 224 are U-shaped to straddle bearing brackets 230 and the offset leg portions 235 of the rocker arms are secured to such hubs as by bolts 236 (Fig. 3).

The offset leg portions 235 of the rocker arms are somewhat longer than the lower legs so as to multiply the motion imparted by the cam 226 to the pin racks. The upper end of each leg portion 235 is fork-shaped forming an elongated slot 238 (Fig. 3) embracing a roller 240 (see Fig. 2) which cams in the slot as the arm rocks back and forth in response to the cam 226. The roller 240 is rotatably journaled upon a stud 242 which is rigidly secured in the stud bracket 244 as shown in Fig. 1. The stud bracket is secured as by bolt 246 (Figs. 1 and 3) to the pin rack brackets 168. A washer 248 and a split pin 250 (Fig. 1) retain the roller on the stud. A cam roller 252 (Fig. 3) is rotatably journaled upon a stud 254 that is fixed to the lower end of the short leg of the rocker arm by the nut 256, and projects into the camway 257 of the cam 226.

Rotation of the cam 226 imparts motion to the short leg of the rocker arm 224 which in turn is multiplied through the long leg 235 of this member and this motion is transmitted into a linear movement through roller 240 to the pin rack mechanism. The transverse rows of pick-up pins are thus carried, one by one, from the pick-up position to the discharge position, as shown in Figs. 5, 6 and 7, or vice versa. Movement of the pick-up mechanism is coordinated with that of the displacement tubes through proper setting of cams 126 and 226 so that the pick-up pins are in position over the tubes when the tubes move upwardly with their charges of cherries, and are discharging cherry pieces while the tubes are renewing their charges.

In order to release the impaled cherry pieces from the pick-up pins, stripper bars 258 (Figs. 5, 6, 8 and 9) are provided that extend the full width of the machine taking in a whole transverse row of pick-up pins. A separate stripper bar is preferably provided for each transverse row of pick-up pins in order that one row after the other may discharge its charge of cherry pieces. It will be understood, however, that these may be combined into a single stripper encompassing all pins if it is desired to discharge all cherry pieces simultaneously. Also, that a single stripper may be provided at the discharge position for each longitudinal row to release cherry pieces from each line of pins as they move into position.

In the disclosed embodiment the stripper bars 258 fit over the pick-up guide tubes 196 of the pin racks and are secured at their ends to brackets 260 as by welding. This construction may be best seen in Fig. 8 of the drawings. The brackets 260 are slidably fitted over the guide studs 170, previously referred to, secured in the brackets 168 that carry the pin racks and, accordingly, the stripper bars move along with the pin rack mechanism. It will be observed from Figs. 8 and 9 that the studs 170 are made of sufficient length that the stripper bar brackets may move a considerable distance downwardly to carry the stripper bars past the barbs 212 of the pick-up elements 164, thus enabling the stripper bar to force off the barbs any cherry pieces that may be held thereby.

The stripper bars are of gravity acting character. They are raised above the barbs 212 of the pins and maintained there until the cherry pieces are to be discharged by a cam roller 262 connected to each end bracket 260 through a stud 263 (Figs. 3 and 8) upon which it is rotatably journaled. The cam rollers 262 ride upon longitudinally extending stationary flat cams 264 (Figs. 1 and 3) one of which is located at each side of the machine and whose contour determines the movement of the stripper bars.

The stationary cams 264 are held by bolts 266 to a rear frame comprising two L-shaped brackets 268 connected at their upper ends by a tying angle 270 as by welding (see Figs. 1 and 3). The lower ends of the L members 268 project inwardly and are held as by the bolts 272 (Fig. 1) to adjustable tank brackets 35 secured to the posts 22. Tie-straps 274 (Fig. 1) are provided at the intersections of the L members and the upper tie piece and rigidify the frame by connecting it back to the adjustable brackets 72, also secured to the posts 22. The straps 274 are held to the tie member and brackets by screws 276.

It will be observed that the stripper cams 264, as shown in Fig. 3, extend longitudinally over the tanks cantilever fashion, and have a horizontal cam track portion 278 and a downward sloping track portion 280 connecting the horizontal portion. Moreover, it will be observed that the entire weight of the stripper bar mechanism is upon these cam tracks and that as the cam rollers 262 follow the tracks the stripper bars move from one vertical plane to another, dropping to a lower plane and past the barbs of the pick-up pins as the rollers go down the sloping track portion 280. Check nuts 282, Figs. 3 and 8, are provided upon the studs 170 that carry the stripper bar brackets 260 to prevent the stripper bar mechanism from dropping off the pick-up mechanism in the event that the cam rollers should over-ride the cam tracks. These check nuts also act as limit stops for the downward movement of the stripper bars.

When the pick-up mechanism is in the position shown in Fig. 5, the pick-up pins are then immediately over and substantially coaxial with the cherry displacement tubes and as the tubes move upwardly, the barbs pierce the cherry pieces carried by the tubes and they remain upon the former as the displacement tubes again recede into the tank. At this time the stripper bar rollers 262 are all engaged, as shown in Fig. 3, with the horizontal track portion 278 of the cams 264. The position of the stripper bar at this time in relation to the pins is shown in greater detail in Fig. 8. As the pick-up mechanism is moved to the right, as shown in Figs. 6 and 7, the rows of pick-up pins pass directly over discharge or delivery hoppers 282. In this motion of the pick-up mechanism the stripper bar rollers change from the horizontal track portion 278 to the downwardly sloping portion 280 and carry the stripper bars downwardly over the pick-up pins until finally when the pick-up pins are above the discharge hoppers 282 the stripper bars go past the ends of the barbs and strip any cherry pieces therefrom directing the same into the hoppers. It will be observed from Figs. 6 and 7 that this action occurs with each transverse row of pick-up pins, one row after the other. When all of the rows have discharged their cherry burden, as shown in Fig. 7, the pick-up mechanism then returns to its position over the displacement tubes for a further charge of cherry pieces. The cams 264 are adjustable so as to accurately determine the point at which the stripper bars remove the cherry pieces from the pick-up pins and direct them to the discharge tubes 282. The bolt holes in the base of the cams for receiving the bolts 266, are slotted as at 283 (Fig. 1) to provide for this adjustment.

The discharge or delivery mechanism D comprises hoppers 282 arranged in a bank, as shown in Figs. 1 and 2, along the rear side of the machine and are secured as by bolts 284 to the tie-bar 270 of the stripper cam supporting frame. In the exemplified embodiment a separate hopper is provided for each longitudinal row of pick-up pins. The hopper is open at the top and bottom and tapers, as shown in Fig. 5, from the upper end to the lower end thereof. The inner surface 285 of the hopper is of a roughened character, being pebbly-like or furnished with a multiplicity of small bumps in a nature of a hammered surface. This is an important feature in connection with handling cherry halves as it prevents cherry pieces dropping from the pick-up pins, upon being stripped therefrom, from sticking to the surface of the hopper by the suction effect of their cupped portions. If the surface 285 were smooth, half cherries could readily stick to it and not be discharged.

Connected to the lower end of the hoppers 282 are straight discharge or delivery tubes or chutes 286 which are connected to the hopper by a flexible or resilient sleeve 288, for instance of rubber, held to the tubes by the wire tie members 290. Thus the delivery tubes are flexible in nature and it will be observed from Fig. 1 that these discharge or delivery tubes may be grouped together in order to deliver the cherry pieces from more than one longitudinal row of pick-up pins to a single delivery point, for example a container, held below the grouped discharge tubes. The tubes may be held in grouped relationship by tie-backs or clasps 292 (see Fig. 1) which are slidably adjustable on a bar 294 held by screws 296 to the frame member 268.

As shown in Fig. 1, all but the delivery tube at the extreme right are grouped in pairs. It will be understood, however, that more than two of these tubes may be grouped together at one point, and that various combinations may be obtained in order to deliver the same or different counts of cherry pieces to succeeding containers moved with respect to the discharge tubes.

*Container feeding and discharge mechanism*

Inasmuch as the present apparatus has particular use in fruit canning and packing, cooperating mechanism F is also provided for continuously bringing containers into position with respect to the discharge tubes 286 of the apparatus, and removing such containers after receiving their charge of cherry pieces. Moreover, provision is made for moving one or more containers into position below the discharge tubes where they are held for an interval of time sufficient to receive their charge and are then moved on to the discharge end of the machine. Furthermore, movement of the containers is coordinated with the pick-up mechanism so that one or a battery of containers, as the case may be, are in position to receive a charge of cherry pieces when the pick-up mechanism is discharging the same. It will be understood of course that if desired the containers may be continuously moved past the delivery tubes, their rate of movement being adjusted to enable each container to receive its charge as it passes below its discharge tube.

Referring now more particularly to Figs. 1 to 5 inclusive and Figs. 17 to 19 inclusive of the drawings which illustrate the container delivery and discharge mechanism, the containers are carried and moved by a belt 300 in the direction of the arrows in these figures. The belt is continuously driven from a drive pulley, not shown, the upper run of the belt passing over an idler pulley 302, Fig. 1, to a plate or apron 304 having integral supporting arms 306 (Figs. 1 to 3). These arms are secured as by bolts 308 to brackets 310 adjustably secured by set screws 312 to the posts 22 at each end of the machine.

The belt 300 passes, as shown in Fig. 1, from the plate 304 over a further pulley 314 from which it returns to the drive pulley by passing below the plate 304. From the belt 300, the containers are transferred, as shown in Fig. 1, over a stationary plate 316 to a further moving belt 318, carried by pulleys 320, for further operations. The pulleys 302, 314 and 320 are fixed to shafts 322 which are rotatably journaled in the bearing brackets 324, supported by means not shown. A catch plate 326 is positioned below the lower run of the belt 300 to protect operators therefrom and provide a spill table for fruit pieces. The catch plate is supported by the brackets 328 to which it is held as by riveting. The brackets 328 are in turn secured to the container guide mechanism to be presently described.

In order to direct the containers to their proper position below the discharge tubes 286, a guide channel 330 is provided extending substantially centrally of the belt 300. The channel is formed by outer and inner guide rail members, one of which is positioned adjacent to each edge of the upper run of the belt 300. Each guide member consists as shown in Figure 3 of the upper guide bar 332 and lower guide bar 334, secured as by welding to the end brackets 336 which are secured to the plate straps 306 as by bolt 338.

The container guides are adjustable to and away from each other to permit the guide channel to accommodate and centralize different sized containers. For this purpose, slots 340, Fig. 2, are provided in the plate supports 306, with the slots of sufficient length to accommodate an adjustment for the various sized cans to be used with the machine. To assist the operator in making rapid settings during a day's run when a change is to be made in the size of the containers to be fed by the belt, the slots are suitably indexed with numerals corresponding to the different sized cans and a zero marking provided on the foot of the brackets 336. In addition, a table of can sizes and settings is provided at some point on the mechanism, for instance the tank 30, where it may be readily observed by the operator, or referred to in making changes.

A stop mechanism to control movement of the containers past the discharge tubes 286 and comprising, as shown in Figs. 17 to 19 inclusive, a feed stop unit 342 to control movement of containers from the feed line into cherry receiving position and a similar discharge stop unit 344 to control discharge of filled containers is located immediately behind the container feed channel. Each stop unit comprises, as shown in Figs. 1 and 3, a stop arm slide frame 346 which is secured to the under face of a supporting bracket 348 by bolt 350 (Fig. 1). The bracket is adjustably mounted upon the nearest post 22 by a set screw 352.

The slide frame 346 is of U-shape (see Fig. 5) and is located in inverted position so that the sides thereof point downwardly and provide bearings for slidably fitted parallel reciprocating rods 354 and 356, which operate in these portions of the frame. Moreover, the frame is so located that the rods operate from front to rear of the machine. Furthermore, the rods carry a connecting block 358 which is fixed to the adjacent ends of these rods at the rear side of the machine. Fixed to each block 358 and projecting horizontally and normal to the rods 354 and 356 is a stop bar 359 which is adjustably slidable in the block and is locked therein by a set screw 360.

As shown in Figs. 17 to 19, a stop finger 362 is connected to the end of the stop bar of the feed stop unit 342, and at right angles thereto and projects in a horizontal position, in the direction of the container feed channel. A similar stop finger 363 is connected to the discharge stop unit 344 and is similarly positioned. It will be observed from Figs. 17 to 19 that the stop fingers are located between the two stop units but it will be understood that this positioning is optional and that the stop fingers may be located on the same or different sides of the stop units as desired.

The stop fingers 362 and 363 are reciprocated in and out of the container channel through the slide rods previously mentioned and the slide mechanism is driven through a laterally projecting pin 364 which is fixed to the lower slide rod 356 between the bearings of the frame 346. The pin terminates in a collar portion and is held to the slide rod by the set screw 366, as shown in Fig. 4.

Motion is imparted to each slide mechanism by levers 368 (Figs. 4 and 5) each having its fulcrum in a bracket 370, secured by bolt 372 to the base 20. The levers are pivotally mounted in the brackets 370 by means of pins 374 which are rigidly secured in the levers. The upper ends of the levers are fork-shaped (see Fig. 5) and fit over the operating pins 364 of the slide mechanism. The levers 368 are rocked by cams 376 located on each side of the machine, through cam rollers 378 which engage the endless camway 380 of the cams, and are secured to the levers substantially midway their length by studs 382. The cams are fixed to the main driveshaft 106 and rotate therewith.

As previously indicated, the two stop units are of the same character. However, the cam of one is set slightly ahead of the other in order that the action depicted in Figs. 17, 18 and 19 may be obtained. Thus, the cams are set so that the stop finger 362 (Fig. 17) moves into the container channel to stop motion of containers moving in from the feed line. In the meantime, the stop finger 363 is moved out of the container channel and permits any containers that were previously held between the stops to pass it. After the containers have passed out of the space between the two stop fingers, stop finger 363 (Fig. 18) again moves into the container channel. When this occurs, stop finger 362 is moved out of the channel and containers X, as shown in Fig. 18, are permitted to move past it up to the stop finger 363. When the containers have come to rest, stop finger 362 is again moved into the container channel and the positioning of the stops and containers is then as shown in Fig. 19, which shows a bank of containers X held between the two stop fingers and stop finger 362 acting to hold back containers Y of the feed line. When the containers X are ready for discharge, stop finger 363 is again moved out of position to permit the containers X between the stop fingers to move on to the discharge position.

It will be observed from Figs. 17 to 19 inclusive that the stop fingers 362 and 363 of the stop units 342 and 344 respectively are laterally adjustable by moving the stop finger bars 359 in the blocks 358. In this manner the distance between the stop fingers 362 and 363 may be adjusted to accommodate any predetermined number of cans within the range of the adjustment. Thus for example, as shown in Fig. 19, the stop fingers are set to receive a bank of five containers. However, by moving the stop finger bars 359 laterally the number of containers between the stop fingers can manifestly be increased, for example, to 9. It is merely necessary to provide sufficient length to the stop finger bars to set the range to anything from one container upward. A further feature of the stop finger mechanism is the ease with which the stop mechanism may be disconnected from the container feed line in case of need. It is merely necessary to loosen the set screw 360 holding the stop finger bars and flip the stop fingers over out of the container feed channel and the containers may then be continuously fed by the belt, past the machine. This feature is quite helpful where the containers are being fed past a series of machines.

Operation

In operation of the disclosed embodiment of the invention, liquid is provided in the tanks 30 and 32 up to the level 48 and a mass of cherry pieces is placed in the tank 32. The pick-up elements 164 are checked for count and those not to be used are placed in the held-out position. In addition, partitions 77 are properly positioned or entirely omitted if the entire volume of the tank is to be employed. Moreover, the discharge tubes 286 are arranged in the desired grouping to deliver the requisite count of cherry pieces to the containers passing below them upon the belt 300 and the stop fingers 362 and 363 are set for the desired number of containers.

Power is now imparted to the motor 134 and to the belt 300 of the container feed mechanism, and rotation of the latter and the cams 126, 226 and 376 on the drive shaft 106 is started.

Assuming the mechanism is in the position illustrated in Fig. 5 the displacement tubes 82 now start moving down into the tank 32. When the cherry engaging seats 86, thereof have just gone below the liquid surface, the pistons 140 enter the tubes and begin applying pressure against the liquid therein. Continued downward movement of the tubes causes the forceful exit of liquid from the openings 84 of the cherry engaging seats of the tubes and produces a disturbance or stirring of the cherry mass in the tank 53 by reason of the liquid jets emitting from the openings. As a result, the cherries in the tank 32 now begin to float about.

By the time the tubes have reached the limit of their downward movement and are below the mass of floating cherry pieces, the pick-up mechanism has also moved and both are now in the relative position shown in Fig. 7.

The tubes 78 now start moving upwardly through the mass of cherry pieces, picking up cherry pieces directly in their path and drawing other cherry pieces to them by reason of the suction effect created by the piston 140 which now exhausts liquid from the lower end of the tubes creating a vacuum ahead of the piston and thereby drawing liquid in small streams through the openings 84, of the seats 86 through which streams suction influence is imparted to cherry pieces in the vicinity of the tubes adjacent the cherry engaging seats.

While the tubes 82 rise, the pick-up mechanism starts movement toward the pick-up position above the tubes and as this occurs the discharge stop finger 363 of the container feed mechanism moves out of the container guide channel to permit any containers held thereby to pass on, as shown in Fig. 17, the container feed line being meanwhile held up by the stop finger 362. When a sufficient time has elapsed for any containers between the two stops to clear the discharge stop finger 363, it again starts moving in, as in Fig. 18, and as this occurs the stop finger 362 moves out, as also shown in this figure, and permits a new supply of containers to move into position and approach the stop 363. Such movement is designated by the containers marked X in Fig. 18. By the time the leading container X reaches the stop finger 363, stop finger 362 begins to move in and hold the containers marked X between the two stop fingers.

When the cherry displacement or feeding tubes 82 have reached the surface of the liquid, the pistons 140 leave the tubes, thus breaking any further suction effect at the cherry engaging seats 86 of the tubes. The tubes then continue their upward movement with such cherry pieces as are retained upon the seats of these tubes.

The pick-up mechanism has by now completed its return movement and since the pick-up elements 164 are thus directly over the displacement tubes 82 the cherry pieces at the center of the seats thereof impact the barb pointed pins 210 of the pick-up elements just above them, which by reason of their mass penetrate and impale the cherry pieces.

The cherry pieces having now been impaled by the pick-up elements, the tubes 82 start moving downward for a further charge and the pick-up mechanism moves toward its discharge position above the discharge hoppers 282. As each pick-up element 164 passes above its respective discharge hopper, the stripper bar 258 which has now moved downwardly due to the cam track 280, strips the cherry pieces off the pins and they fall into the hopper from which they pass into their respective connecting delivery chutes 286 and into the containers above which the chutes are positioned.

When the pins have all discharged their respective cherry pieces the pick-up mechanism again returns to the pick-up position above the delivery chutes and the discharge stop 363 again functions to release the containers that have just been filled. This condition is depicted in Fig. 17 where the containers X are shown moving past the discharge stop 363. While this occurs the feed line is held back by the stop 362. When the cans X have cleared the stop 363, the stop 362 functions as described previously to permit a new bank of containers to move into position to receive their charges of fruit by the foregoing operations.

From a consideration of the foregoing preferred embodiment of my invention, it will be seen that I have provided a novel method and apparatus for feeding cherry pieces or other fruits, and a novel method and apparatus for continuously and repeatedly delivering accurate predetermined counts of such fruit pieces to a source of delivery or use, for instance, containers being packed with fruit pieces. It will be apparent that the mechanism of the invention is very flexible and is capable of many combinations of counts.

It will also be manifest that while the particular method and apparatus herein described is well adapted to carry out the objects of the present invention, the invention embodies many features of construction, assembly and operation and it will be understood by those skilled in the art to which the invention appertains that various modifications, changes and substitutions may be made in the invention without departing from the spirit thereof.

Thus, for example, certain liquid logged fruits, such as pineapple pieces, are floated only with difficulty and there is a tendency sometimes for the displacement tubes 82 to form what I term "holes" in the mass, in spite of the liquid agitation provided. In such cases, agitation may be supplemented or entirely provided by mechanical or other suitable means, for instance the member 384 depicted in Fig. 20, in which the apparatus is shown in the same relative position as that in Fig. 5.

The member 384 comprises a plate 386 loosely mounted over the piston rods 142. A plurality of vertical rods 388 are rigidly mounted to the plate, the rods being positioned centrally in the spaces between the tubes 82. The rods 388 have end portions 390 which are riveted into suitable holes in the plate 386, and the upper portions of the rods pass through clearance holes 392 in the displacement tube carrying plate 91 and through holes 394 in the bottom 64 of the receptacle 32. The member 384 is moved vertically by a bell crank 396 pivotally journalled on a pin 398 held in a bracket 400 mounted on the piston rod tie plate 152, by the screw 402. One arm of the crank has a rounded tip 404 which cams against the under side of the plate 386 and the other arm has an upwardly turned portion 406 which in operation cams against a block 408 held to the under side of the displacement tube carrying plate 91, by the screw 410. The member 384 is supported in its down position by the crank 396, which then rests upon a stop pad 412 on the bracket 400.

During the fruit displacement operation the member 384 is in the position shown in Fig. 20. However, when the tubes 82 move downwardly and have completed a substantial portion of their agitating stroke through the mass of fruit pieces, the block 408 intercepts the crank 396, swinging the same on its pivot 398 and producing an upward movement of the plate 386 and rods 388 which continues to the end of the downward movement of the tubes. In this action the rods 388 tend to lift any fruit pieces which may have collected or settled in the lower portion of the tank between the tubes 82 and produce a further disturbance of the mass of fruit pieces as a result of which there is a lateral movement of certain fruit pieces over the tubes 82 to fill the "holes" made thereby in their down movement. When the tubes 82 again move upwardly, the rods 388 move downwardly by reason of their own weight, moving the crank 396 to its normal position. The stroke of the rods 388 is indicated by the dotted lines in Fig. 20 from which it will be evident that only a small amount of movement is necessary to produce the desired effect. It will also be noted that the rods move in a direction opposite to that of the tubes 82.

In view of the above, I desire the invention to be construed to include all modifications, changes and substitutions as may be within the spirit of the invention as expressed in the foregoing specification and as may come within the scope of the following claims.

What I claim as new and desire to protect by Letters Patent is:

1. The method of feeding a predetermined number of fruit pieces from a promiscuous mass thereof comprising immersing the fruit pieces of said promiscuous mass in a liquid medium, attracting and lifting fruit pieces in said liquid medium to isolate at least said predetermined number of fruit pieces from said promiscuous mass, and of said isolated number impaling said predetermined number and conveying the impaled number of fruit pieces to a place of use or delivery.

2. The method of separating individual fruit from a promiscuous mass thereof comprising immersing fruit of said mass in a liquid body, directing a jet of said liquid into said mass to produce buoyant motion of said fruit in said liquid body, and then ceasing to direct the jet of said liquid, and applying an ascending suction in the liquid body thereby attracting and lifting fruit pieces in said liquid to isolate fruit from the mass of fruit in said liquid body.

3. The method of feeding a predetermined number of fruit pieces from a promiscuous mass thereof comprising applying suction to a limited zone of said mass to attract a batch of fruit, lifting the batch of fruit attracted by said suction to isolate the same from said mass, and separating a predetermined number of fruit pieces from the isolated batch.

4. The method of separating a predetermined count of fruit pieces from a promiscuous mass thereof comprising subjecting said mass to the action of a liquid body, applying suction along a predetermined path within said liquid body to attract a limited number of fruit pieces, withdrawing fruit pieces held by said suction from said mass, releasing said suction, separating a predetermined number count of fruit pieces from those withdrawn and conveying said predetermined count of fruit pieces to a place of use or delivery.

5. The method of separating fruit pieces from a promiscuous mass thereof comprising submerging said mass in a liquid body, lifting a batch of fruit pieces from said mass with the aid of suction to a point of isolation and then separating from said batch a fruit piece drawn to the center of influence of said suction.

6. The method of feeding a predetermined number of fruit pieces from a promiscuous mass thereof comprising subjecting said mass to the action of a liquid body, agitating said mass to produce buoyant action of the fruit pieces in said liquid body, applying suction along a path commencing within said liquid body and ending adjacent the surface thereof to attract fruit pieces from said mass, lifting fruit pieces attracted by said suction from said liquid to a point of impalement, impaling a predetermined number of said attracted fruit pieces, moving the impaled pieces away from said liquid body, and discharging the impaled pieces at a place of use or delivery.

7. The method of separating a predetermined count of fruit from a promiscuous mass thereof comprising subjecting said mass to the action of a liquid body, agitating said mass in said liquid, applying suction to said mass in said liquid for attracting a number of fruit pieces, moving fruit held by said suction free of said liquid body to a point of impalement, and impaling a piece of said fruit so moved.

8. The method of feeding a predetermined number of fruit pieces from a promiscuous mass thereof comprising subjecting said mass to immersion in a liquid body, directing a plurality of jets of liquid upwardly into said liquid body to agitate said fruit pieces and produce buoyant motion thereof, applying suction along a plurality of paths within said liquid body and extending to adjacent the surface thereof, lifting fruit pieces grasped by said suction to above said mass, subjecting a predetermined number of fruit pieces so lifted along each said path to impalement, and collecting the impaled fruit pieces at a place of use or delivery.

9. In the packing of fruits, the method of feeding a predetermined number of fruit pieces from a promiscuous mass thereof to a place of use or delivery comprising immersing said fruit mass in a liquid body, agitating said fruit mass, applying suction to said fruit mass for attracting fruit pieces therefrom, isolating from said mass fruit held by said suction, impaling a predetermined number of fruit pieces of the fruit so isolated, moving said impaled fruit to a place of delivery and then forcibly discharging said impaled fruit at said place of delivery.

10. In apparatus for feeding fruit from a promiscuous mass thereof, fruit isolating mechanism comprising displacement means for isolating fruit from said mass and suction means for providing retainment of fruit with respect to said displacement means when isolating said fruit.

11. In apparatus for feeding fruit from a mass thereof, fruit isolating mechanism comprising displacement means for isolating fruit from said mass, suction means associated with said displacement means for providing retainment of fruit with respect to said displacement means when isolating said fruit, and relief means associated with said suction means to automatically adjust the suction to prevent mutilation of said fruit.

12. In apparatus for feeding fruit pieces from a promiscuous mass thereof in a liquid, fruit isolating mechanism comprising a hollow member having a fruit engaging seat for displacing fruit from said mass, means operably associated with said hollow member for effecting attraction of fruit pieces adjacent said seat and retainment of attracted fruit pieces thereon, and means to move said mass and member relative to each other whereby said member penetrates said mass in said liquid.

13. In apparatus for feeding fruit from a mass thereof in a liquid, fruit isolating mechanism comprising a hollow fruit displacement member having a perforate fruit engaging seat arranged for reciprocating movement in said liquid, a piston operable in said member for producing suction adjacent said seat to attract and hold fruit thereon, and means for reciprocating said member and piston relative to each other.

14. In apparatus for feeding fruit from a mass thereof in a liquid, fruit isolating mechanism comprising a hollow fruit displacement member having a perforate fruit engaging seat and a piston associated with said member for producing suction adjacent said seat to retain fruit thereon, said piston being normally loosely interfitting with said hollow member and said piston having a flexible marginal portion adapted to flex in response to excessive suction resistance at said seat by said fruit to thereby reduce the suction and substantially prevent mutilation of the fruit.

15. In apparatus for feeding fruit pieces from a promiscuous mass thereof in a liquid, fruit isolating mechanism comprising a tubular member having a perforate fruit engaging seat for displacing fruit from said liquid mass, a piston operable in said member for alternately producing suction and agitation in the liquid adjacent said seat, a piston rod for directing said piston, means for reciprocating said member and piston relative to each other, and means for adjusting said piston for altering the point of cut-off of said suction and beginning of said agitation.

16. In apparatus for feeding fruit from a mass thereof in a liquid, fruit isolating mechanism comprising displacement means operable in said liquid for isolating fruit therefrom, and fluid acting means associated with said displacement means for periodically producing attraction and agitation respectively of fruit pieces adjacent said member in operation thereof.

17. In apparatus for feeding fruit from a mass thereof in a liquid, fruit isolating mechanism comprising a chamber containing a liquid for buoyantly supporting a promiscuous mass of fruit, a tubular member for displacing fruit from said liquid, said member having a perforate fruit engaging seat at one end and an opening adjacent its opposite end, a piston operable in said member for alternately producing suction and agitation in the liquid adjacent said seat, a piston rod arranged in said chamber for supporting said piston, a guide head in advance of said piston on said rod, and means for reciprocating said member relative to said piston for alternately agitating said mass of fruit and attracting a limited number of fruit pieces thereof whereby to isolate said limited number of fruit pieces from the promiscuous mass thereof.

18. In apparatus for feeding fruit pieces from a promiscuous mass thereof in a liquid, fruit isolating mechanism comprising a plurality of tubes for displacing fruit pieces from said mass in said liquid, said tubes having perforate fruit engaging seats at one end and an opening adjacent the opposite end, means including a tie member adjacent the ends of said tubes remote from said seats, for simultaneously moving said tubes in and out of said mass, and flexible rubber pistons stationary with respect to said tubes and operable in said tubes upon movement of said tubes, whereby to alternately produce suction and agitation in the liquid adjacent said seats.

19. In apparatus for separating a predetermined number of fruit pieces from a mass thereof in a liquid, means for agitating said fruit in said liquid, displacement means for isolating fruit from said mass, suction means associated with said displacement means for attracting fruit pieces thereto, and means for removing a predetermined number of fruit pieces from said displacement means.

20. In apparatus for feeding individual fruit pieces from a promiscuous mass thereof, displacement means including a fruit engaging seat, movable in and out of said mass for isolating fruit pieces therefrom, means for moving said displacement means, means associated with said displacement means for positioning a portion of at least one fruit piece within a predetermined area of said seat in each fruit displacing movement of said displacement means, and means for intercepting said fruit piece in said predetermined area and removing said fruit piece from said displacement means.

21. In apparatus for feeding fruit pieces from a promiscuous mass thereof in a liquid, a tank for receiving said mass in a liquid, displacement means movable through said mass and liquid for isolating fruit pieces therefrom, piston means within said displacement means, means for moving said displacement means relative to the piston, means on said tank for guiding said displacement means for said movement to agitate and attract fruit pieces, and means substantially co-axial with said displacement means for receiving an individual fruit piece from said displacement means when the latter is moved to attract fruit pieces.

22. In apparatus for feeding fruit from a promiscuous mass thereof in a liquid, a tank for receiving said mass in a liquid, displacement means for isolating fruit from said mass, means for moving said displacement means in and out of said mass, means associated with said displacement means for agitating said mass in said liquid upon said inward movement of said displacement means and providing suction adjacent said displacement means during said out movement, impaling means for removing fruit from said displacement means by impact of the latter against said impaling means, means for transferring the impaling means toward a place of use or delivery in timed relation with the inward movement of the displacement means, and means operatively associated with the transferring means for stripping the impaled fruit from said impaling means at said place of use or delivery.

23. In apparatus for separating a predetermined count of fruit pieces from a promiscuous mass thereof, a plurality of displacement means for isolating fruit pieces from said mass at a plurality of points, separate pick-up means associated with each of said displacement means for picking up fruit pieces at said points, and means for selectively determining which of said pick-up means shall pick up fruit at said points.

24. In apparatus for feeding a predetermined number of fruit pieces from a promiscuous mass thereof, a plurality of displacement members arranged to penetrate said mass and isolate fruit pieces therefrom, means for moving said displacement members, a plurality of individual pick-up members arranged to dispose one pick-up member above each displacement member for removing an individual fruit piece therefrom, means for discharging said fruit pieces from said pick-up members, and means for rendering the individual pick-up members temporarily inoperative whereby to discharge any predetermined number of fruit pieces not exceeding the total number of pick-up members.

25. In apparatus for feeding fruit pieces, fruit engaging means for moving a limited number of fruit pieces from a promiscuous mass thereof, and pick-up mechanism comprising a weighted pin arranged in the path of movement of said fruit engaging means for impaling fruit by impact of movement of said fruit engaging means, and means for guiding said pin during impact.

26. In apparatus for feeding fruit pieces, a fruit seat for moving a number of fruit pieces to a point of isolation, pick-up mechanism comprising an impaling pin normally aligned with said fruit seat for receiving individual fruit pieces therefrom, supporting means for moving said impaling pin to a discharge position, and means operatively associated with said supporting means to forcibly discharge fruit pieces from said impaling pin.

27. In apparatus for feeding fruit pieces, fruit carrying mechanism comprising a plurality of racks, fruit carrying pins supported in said racks, stripping bars straddling said pins for discharging fruit pieces therefrom, means for guiding said stripping bars when stripping fruit from said pins, stops for said stripping bars, means for moving said racks and bars to a discharge position and means for controlling said stripping bars whereby fruit pieces are discharged at said discharge position.

28. In apparatus for feeding fruit pieces from a promiscuous mass thereof, a tank for receiving liquid, a second tank within said first tank for receiving said mass immersed in a liquid, a plurality of fruit displacement tubes arranged for up and down movement in said tanks, said tubes each having a perforate fruit engaging seat at their upper ends and having their lower ends opening into said first tank, a flexible piston, for each of said tubes and positioned coaxial within the respective tube and stationary with respect thereto, means for moving said tubes relative to said pistons whereby the latter may create suction adjacent said fruit engaging seats in the upward movement of said tubes for retaining fruit pieces thereon and agitation of said liquid adjacent said seats during downward movement of said tubes for producing buoyant movement of said fruit, fruit pick-up pins arranged over said tubes and in line with said fruit engaging seats and adapted to impact fruit pieces carried by said fruit engaging seats in the upward movement of said tubes to impale said fruit pieces, means for moving said pins into discharge position, means for stripping fruit pieces from said pins, and means for controlling said stripping means to strip fruit pieces from said pins when they arrive at discharge position.

29. In an apparatus for feeding fruit pieces, a tank for receiving liquid, a receptacle within said tank for receiving a promiscuous mass of fruit pieces in a portion of said liquid, means for isolating fruit pieces from said receptacle comprising a reciprocable tubular member having a fruit engaging seat on one end arranged in said receptacle and an open opposite end communicating with said tank, a piston supported by the tank and arranged in said tubular member, means for moving the tubular member relative to said piston for alternately agitating said mass of fruit and attracting a number of fruit pieces to said seat, means associated with said isolating means for lifting individual fruit pieces from said isolating means when the latter is moved to attract fruit pieces, and means for conveying the fruit pieces from said lifting means to a place of use or delivery.

30. The method of separating a predetermined count of fruit pieces from a promiscuous mass thereof comprising subjecting said mass to the buoying effect of a liquid medium, applying suction to the liquid medium to attract fruit pieces of said mass, moving the attracted fruit pieces from said mass to isolate them from remaining fruit pieces thereof, releasing the suction, and impaling one of the fruit pieces by impact as the attracted fruit pieces are isolated from said mass.

31. The method of separating a predetermined count of fruit pieces from a promiscuous mass thereof comprising subjecting said mass to the action of a liquid medium, alternately applying pressure and suction to the liquid medium to alternately agitate the fruit pieces in the liquid medium and attract fruit pieces from said mass, moving the attracted fruit pieces while under the influence of said suction, and impaling one of the attracted fruit pieces by impact of its movement prior to the application of said pressure whereby to separate said impaled fruit piece from said promiscuous mass.

32. Apparatus for separating a predetermined count of fruit pieces from a promiscuous mass thereof comprising a receptacle, a body of liquid in said receptacle for buoyantly supporting a promiscuous mass of fruit, fruit engaging means arranged for reciprocable movement in the receptacle, suction means associated with the fruit engaging means for attracting a number of fruit pieces to the fruit engaging means upon movement of the latter in one direction, means for reciprocating the fruit engaging means relative to the liquid body, and means arranged in the path of movement of the fruit engaging means for receiving a predetermined count of fruit therefrom by the movement thereof in said one direction.

33. Apparatus for separating a predetermined count of fruit pieces from a promiscuous mass thereof comprising a receptacle, a body of liquid in said receptacle for buoyantly supporting a promiscuous mass of fruit, fruit engaging means arranged for reciprocable movement in the receptacle, suction means associated with the fruit engaging means for attracting a number of fruit pieces to the fruit engaging means upon movement of the latter in one direction, means for reciprocating the fruit engaging means relative to the liquid body, impaling means arranged in the path of movement of the fruit engaging means for receiving a predetermined count of fruit therefrom by the movement thereof in said one direction, and means for moving said impaling means to a place of use or delivery.

34. Apparatus for separating a predetermined count of fruit pieces from a promiscuous mass thereof comprising a receptacle, a body of liquid in said receptacle for buoyantly supporting a promiscuous mass of fruit, fruit engaging means arranged for reciprocable movement in the receptacle, suction means associated with the fruit engaging means for attracting a number of fruit pieces to the fruit engaging means upon movement of the latter in one direction, means for reciprocating the fruit engaging means relative to the liquid body, impaling means arranged in the path of movement of the fruit engaging means for receiving a predetermined count of fruit therefrom by the movement thereof in said one direction, means for moving said impaling means to a place of use or delivery, and means operatively associated with the means for moving the impaling means whereby to strip impaled fruit from said impaling means as it reaches the place of use or delivery.

35. An apparatus for separating a predetermined count of fruit pieces from a promiscuous mass comprising a tank for receiving a liquid, a receptacle within said tank for receiving a promiscuous mass of fruit in a portion of said liquid, fruit displacing means having a fruit engaging seat disposed in the receptacle and having an open end communicating with the liquid in said tank, piston means operable within said displacing means, means for reciprocating said displacing means to alternately agitate the mass of fruit and attract a number of fruit pieces therefrom and for moving said attracted number of fruit pieces out of said liquid, and means for receiving a predetermined count of fruit pieces by impact upon movement of said seat out of said liquid.

36. In an apparatus for separating a predetermined count of fruit pieces from a promiscuous mass, a tank for supporting a liquid body, means for impounding a promiscuous mass of fruit in said liquid body, a tubular element having a fruit engaging seat at one end exposed within the impounding means and an opposite end communicating with the liquid body in said tank, a piston in said tubular element and fixed relative to said tank, means for reciprocating the tubular element relative to said liquid body for agitating the mass of fruit pieces upon movement of said seat toward said piston, and for attracting fruit pieces to said seat upon movement of the latter from said piston whereby to move a number of fruit pieces relative to said liquid body, and means for receiving a predetermined count of fruit pieces from said seat by impact for conveyance to a place of use or delivery.

37. In an apparatus for separating successive charges of fruit pieces from a promiscuous mass thereof, the combination of a plurality of individual means for simultaneously feeding a plurality of pieces of fruit from said mass into an isolated position, one or more of said plurality of fruit pieces constituting a single fruit charge, and a plurality of individual means for engaging and transferring a fruit charge from said feeding means to a place of discharge, means for operating said transferring means to repeatedly transfer successive charges from said feeding means to said place of discharge, and means so supporting said individual transferring means that the same may be variably operated to selectively determine the number of fruit pieces in a charge.

BURTON C. COONS.